(12) United States Patent
Zhao

(10) Patent No.: US 11,509,203 B2
(45) Date of Patent: Nov. 22, 2022

(54) CLAW-POLE MOTOR WITH ROTOR FLUX CONCENTRATORS AND POLES AND STATOR WITH SOLENOID COIL AND ALTERNATING STATOR TEETH

(71) Applicant: Moog Inc., East Aurora, NY (US)

(72) Inventor: Steve Zong-Ping Zhao, Woodland Hills, CA (US)

(73) Assignee: Moog Inc., East Aurora, NY (US)

( * ) Notice: Subject to any disclaimer, the term of this patent is extended or adjusted under 35 U.S.C. 154(b) by 496 days.

(21) Appl. No.: 16/522,306

(22) Filed: Jul. 25, 2019

(65) Prior Publication Data

US 2020/0036243 A1  Jan. 30, 2020

Related U.S. Application Data

(60) Provisional application No. 62/702,954, filed on Jul. 25, 2018.

(51) Int. Cl.
*H02K 21/04* (2006.01)

(52) U.S. Cl.
CPC .................................. *H02K 21/044* (2013.01)

(58) Field of Classification Search
CPC .... H02K 21/044; H02K 21/048; H02K 1/145; H02K 1/243; H02K 3/325; H02K 3/525; H02K 3/528
USPC .... 310/156.66, 156.69, 156.71, 156.73, 263, 310/257
See application file for complete search history.

(56) References Cited

U.S. PATENT DOCUMENTS

| | | | |
|---|---|---|---|
| 4,379,276 A | 4/1983 | Bouchara et al. | |
| 4,509,564 A | 4/1985 | Sedgewick | |
| 5,483,116 A | 1/1996 | Kusase et al. | |
| 5,552,651 A | 9/1996 | Radomski | |
| 6,060,800 A | 5/2000 | Suzuki et al. | |
| 6,311,383 B1 | 11/2001 | Umeda et al. | |
| 6,774,512 B2 | 8/2004 | Takagi et al. | |
| 6,833,651 B2 | 12/2004 | Pflueger | |

(Continued)

FOREIGN PATENT DOCUMENTS

| | | |
|---|---|---|
| CN | 101741200 A | 6/2010 |
| DE | 4436626 A1 | 1/1996 |
| GB | 13904 | 10/1916 |

OTHER PUBLICATIONS

Alaeddini et al.: "Influence of Various Structural Factors of Claw Pole Transverse Flux Permanent Magnet Machines on Internal Voltage using Finite Element Analysis", Serbian Journel of Electrical Engineering, vol. 12, Jun. 2012, 129-143, DOI: 10.2298/SJEE1502129A (15 pages).

*Primary Examiner* — Maged M Almawri

(74) *Attorney, Agent, or Firm* — Harter Secrest & Emery LLP

(57) ABSTRACT

A claw-pole motor comprising a non-magnetic rotary shaft having a longitudinal axis, a plurality of flux concentrators extending along the longitudinal axis of the rotary shaft, and a plurality of magnetic claw poles extending along the longitudinal axis of the rotary shaft, each of the plurality of flux concentrators alternating with each of the magnetic claw poles about the rotary shaft, and a stator having a plurality of coil assemblies, each coil assembly including a solenoid coil and an enclosure having a upper portion and lower portion, the upper portion and the lower portion of the enclosure having alternating stator teeth about the longitudinal axis.

16 Claims, 21 Drawing Sheets

(56) References Cited

U.S. PATENT DOCUMENTS

| | | |
|---|---|---|
| 7,692,344 B2 | 4/2010 | Masaki et al. |
| 7,714,472 B2 | 5/2010 | Kuroda |
| 7,994,684 B2 | 8/2011 | Inoue et al. |
| 9,083,216 B2 | 7/2015 | Takemoto et al. |
| 9,407,129 B2 | 8/2016 | Shlakhetski et al. |
| 9,584,060 B2 * | 2/2017 | Takemoto ............ H02K 1/2713 |
| 9,787,148 B2 | 10/2017 | Yamada et al. |
| 9,887,608 B2 | 2/2018 | Takemoto et al. |
| 9,923,420 B2 | 3/2018 | Takemoto et al. |
| 2005/0067917 A1 | 3/2005 | Kastinger et al. |
| 2009/0001843 A1 | 1/2009 | Enomoto et al. |
| 2009/0243406 A1 * | 10/2009 | Jack ....................... H02K 1/146 |
| | | 310/44 |
| 2012/0200177 A1 * | 8/2012 | Atkinson ............... H02K 41/02 |
| | | 310/44 |
| 2013/0154397 A1 | 6/2013 | Sullivan |
| 2013/0207502 A1 * | 8/2013 | Yamada ............... H02K 1/2713 |
| | | 310/156.66 |
| 2013/0270928 A1 * | 10/2013 | Nord ........................ H02K 1/12 |
| | | 310/44 |
| 2015/0084466 A1 * | 3/2015 | Tsuchiya .............. H02K 1/2733 |
| | | 310/156.07 |
| 2015/0084470 A1 | 3/2015 | Takemoto et al. |
| 2015/0155748 A1 * | 6/2015 | Nord .................... H02K 21/227 |
| | | 310/156.02 |
| 2016/0149443 A1 * | 5/2016 | Hashimoto ............ H02P 6/183 |
| | | 310/257 |

* cited by examiner

CLAW-POLE MOTOR WITH ROTOR FLUX CONCENTRATORS AND POLES AND STATOR WITH SOLENOID COIL AND ALTERNATING STATOR TEETH

TECHNICAL FIELD

The present invention relates generally to claw-pole motors, and more particularly to a claw-pole motor having an improved stator and rotor assembly.

BACKGROUND ART

Claw-pole type motors generally comprise a stator having a plurality of circumferentially spaced claw poles that extend in the axial direction, and a rotor having a plurality of permanent magnets arranged along its circumference, wherein the motor rotates the rotor using electromagnetic forces generated between the stator and the rotor.

For example, U.S. Patent Publication No. 2009/0001843 entitled "Rotating Electrical Machine" is directed to a motor having a claw-pole stator with a stator core that includes a plurality of claw poles and a stator coil wound inside the stator core, and a rotor rotatably disposed at a position facing opposite the claw poles.

U.S. Pat. No. 7,714,472 entitled "Multiple Phase Claw Pole Type Motor" is directed to a multiple phase claw-pole type motor having a plurality of claw poles with claw portions extending in an axial direction and having a magnetic pole surface facing a rotor and being separated from the rotor by a small gap. A radial yoke portion extends radially outwardly from the claw portion, and an outer peripheral yoke extends from the radial yoke portion in the same direction as the direction of extension of the claw portion. The claw poles may be alternately placed so that a distal end of each claw portion faces the radial yoke of an adjacent one of the claw poles to form a stator core. An annular core may be interposed between each adjacent pair of the claw poles in the stator core to form a stator.

BRIEF SUMMARY

With parenthetical reference to corresponding parts, portions or surfaces of the disclosed embodiment, merely for the purposes of illustration and not by way of limitation, a claw-pole motor (100) is provided comprising: a rotor assembly (110) having: a non-magnetic rotary shaft (120) having a longitudinal axis (122); a plurality of flux concentrators (130) extending along the longitudinal axis (122) of the rotary shaft (120); and a plurality of magnetic claw poles (140) extending along the longitudinal axis (122) of the rotary shaft (120), each of the plurality of flux concentrators (130) alternating with each of the magnetic claw poles (140) along the rotary shaft (120), each magnetic claw pole (140) of the plurality of magnetic claw poles (140) having a longitudinal center line (144) and crosswise line (146) that is perpendicular to the longitudinal center line (144), a magnetization direction of each of the plurality of magnetic claw poles (140) being perpendicular to the longitudinal center line (144) of a corresponding magnetic claw pole (140), and the magnetization direction of each of the magnetic claw poles (140) being directed towards or away from a corresponding flux concentrator (130) in an alternating order; and a stator assembly (150) having a plurality of coil assemblies (160), each coil assembly (160) of the plurality of coil assemblies (160) including: a solenoid coil (170); and an enclosure assembly (180) having a upper portion (182) and lower portion (186), the upper portion (182) and the lower portion (186) of the enclosure assembly (180) having stator teeth (184, 188), and the stator teeth (184) of the upper portion (182) alternating with the stator teeth (188) of the lower portion (186).

The plurality of coil assemblies (160) may include a first set of coil assemblies (160), a second set of coil assemblies (160), and a third set of coil assemblies (160). Each coil assembly (160) of the first, second, and third sets of coil assemblies (160) may be aligned, respectively. An alignment degree shift between adjacent coil assemblies (160) of the first, second, and third sets of coil assemblies (160) may be $$\frac{360°}{(\text{Total sets of coil assemblies} \times \text{Total number of magnetic claw poles})/2}.$$

Each flux concentrator (130) of the plurality of flux concentrators (130) may have a rectangular cross-section and each magnetic claw pole (140) of the plurality of magnetic claw poles (140) may have a trapezoidal cross-section. Each flux concentrator (130) of the plurality of flux concentrators (130) may be made of a magnetically soft material. Each flux concentrator (130) of the plurality of flux concentrators (130) may have a trapezoidal cross-section and each magnetic claw pole (140) of the plurality of magnetic claw poles (140) may have a rectangular cross-section. The number of stator teeth (184, 188) of the upper portion (182) and the lower portion (186) of the enclosure assembly (180) may be equal to the number of magnetic claw poles (140) of the plurality of magnetic claw poles (140). Each of the upper portion (182) and the lower portion (186) of the enclosure assembly (180) may have twelve triangular stator teeth (184, 188). A first length between adjacent stator teeth (184, 188) of the upper portion (182) and the lower portion (186) of the enclosure assembly (180) may be more than twice a second length between the rotor assembly (110) and the stator assembly (150).

The rotor assembly (110) may include a magnetic claw-pole angular pitch (142) and the enclosure assembly (180) of the stator assembly (150) may include a stator teeth angular pitch (190), and the magnetic claw-pole angular pitch (142) may be equal to the stator teeth angular pitch (190). A distance between adjacent coil assemblies (160) of the plurality of coil assemblies (160) may be greater than or equal to a distance between the rotor assembly (110) and the stator assembly (150). Magnetic flux may flow from a first flux concentrator (130a) of the plurality of flux concentrators (130) to a first stator tooth (188a) of a first coil assembly (160) of the plurality of coil assemblies (160). The magnetic flux may flow from a second stator tooth (184a) and a third stator tooth (184b) of the first coil assembly (160) to a second flux concentrator (130c) and a third flux concentrator (130b) of the plurality of flux concentrators (130). The second stator tooth (184a) and the third stator tooth (184b) may be adjacent to the first stator tooth (188a), the second flux concentrator (130c) and the third flux concentrator (130b) may be adjacent to the first flux concentrator (130a).

In another aspect, a claw-pole motor (300) is provided comprising: a rotor assembly (310) having a rotary shaft (313) orientated about a longitudinal axis (312), a plurality of flux concentrators (314) extending along the rotary shaft, and a plurality of magnetic claw poles (316) extending along the rotary shaft; each of the plurality of flux concentrators (314) alternating with each of the magnetic claw poles (316)

about the rotary shaft; each magnetic claw pole (316) of the plurality of magnetic claw poles having a longitudinal center line and a magnetization direction perpendicular to the longitudinal center line and being directed towards or away from a corresponding flux concentrator in an alternating order; a stator assembly (320) having a plurality of coil assemblies (330, 340), each coil assembly of the plurality of coil assemblies comprising a solenoid coil (337, 347) and an enclosure assembly (331, 341); the enclosure assembly (331, 341) having an inner portion (333, 343), and an outer portion (334, 344); the inner portion (333, 343) and the outer portion (334, 344) of the enclosure assembly (331, 341) each having a plurality of stator teeth (335, 336, 345, 346); and the stator teeth (335, 345) of the inner portion (333, 343) alternating with the stator teeth (336, 346) of the outer portion (334, 344) about the longitudinal axis (312).

The plurality of stator teeth (335, 336, 345, 346) of the inner portion (333, 343) and the outer portion (334, 344) of the enclosure assembly (331, 341) of the stator assembly (320) may extend radially relative to the longitudinal axis (312) and the claw-pole motor (300) may comprise an axial air gap (321, 322) between the plurality of stator teeth (335, 336, 345, 346) of the enclosure assembly (331, 341) of the stator assembly (310) and the plurality of magnetic claw poles (316) of the rotor assembly (310).

The stator assembly (320) may comprise an outer coil assembly (350) comprising an outer solenoid coil (357) and an outer enclosure assembly (351), the outer enclosure assembly (351) having a upper portion (352) and lower portion (354), the upper portion (352) and the lower portion (354) of the outer enclosure assembly (351) each having a plurality of outer stator teeth (355, 356), and the outer stator teeth (355) of the upper portion (352) may alternate with the outer stator teeth (356) of the lower portion (354) about the longitudinal axis (312). The plurality of stator teeth (335, 336, 345, 346) of the inner portion (333, 343) and the outer portion (334, 344) of the enclosure assembly (331, 341) of the stator assembly (320) may extend radially relative to the longitudinal axis (312), the plurality of outer stator teeth (355, 356) of the upper portion (352) and the lower portion (354) of the outer enclosure assembly (351) of the stator assembly (320) may extend axially relative to the longitudinal axis (312), and the claw-pole motor (300) may comprise an axial air gap (321, 322) between the plurality of stator teeth (335, 336, 345, 346) of the enclosure assembly (331, 341) of the stator assembly (320) and the plurality of magnetic claw poles (316) of the rotor assembly (310), and the claw-pole motor (300) may comprise a radial air gap (360) between the plurality of outer stator teeth (355, 356) of the outer enclosure assembly (351) of the stator assembly (320) and the plurality of magnetic claw poles (316) of the rotor assembly (310).

DETAILED DESCRIPTION OF THE EMBODIMENTS

Figure 1:
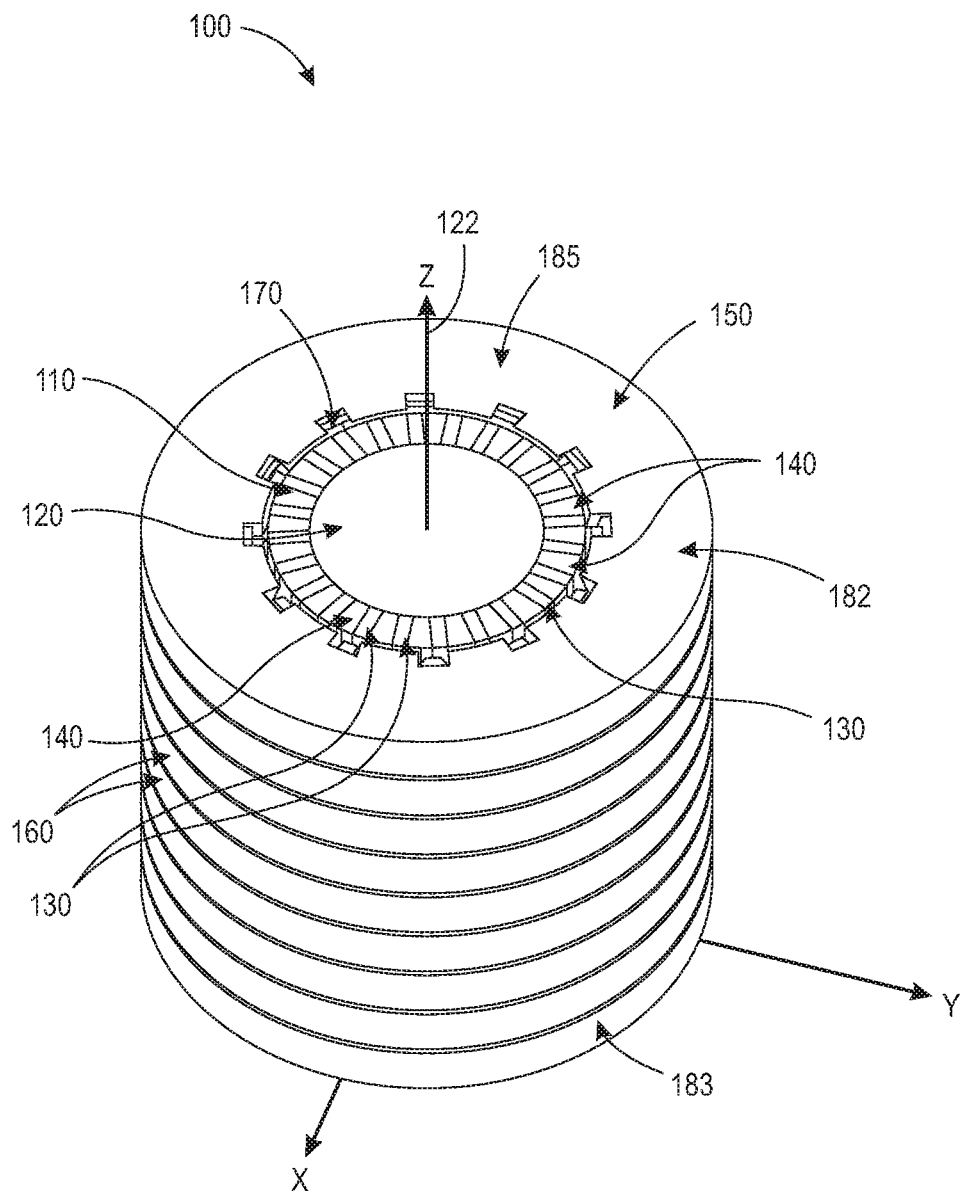
FIG. 1 is a perspective view of a first embodiment of a claw-pole motor having an improved stator assembly and rotor assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIGS. 1-11 thereof, a claw-pole motor is provided, of which a first embodiment is generally indicated at 100. Claw-pole motor 100 is shown as broadly including rotor assembly 110 and stator assembly 150.

Rotor assembly 110 includes non-magnetic rotary shaft 120 orientated about longitudinal axis 120, a plurality of flux concentrators 130, and a plurality of magnetic claw poles 140. Rotor assembly 110 is operationally configured to rotate about longitudinal axis 122 relative to stator assembly 150.

Rotary shaft 120 is non-magnetic. Non-magnetic rotary shaft 120 provides a significant advantage over a magnetic rotary shaft in that it eliminates magnetic interferences with neighboring devices. In a traditional motor, such as a surface mounted magnetic motor, a magnetic steel rotor hub is required to complete the magnetic flux return path. The use of a magnetic hub reduces the remaining non-magnetic shaft diameter, which is undesirable in some applications. It is often the practice to make the rotor hub and motor shaft of one piece out of magnetic steel. When a position feedback device, such as a resolver or an encoder, is mounted on the same shaft, there are magnetic interferences. Claw-pole motor 100 eliminates such issues and preserves the valuable room for a motor shaft.

Figure 9:
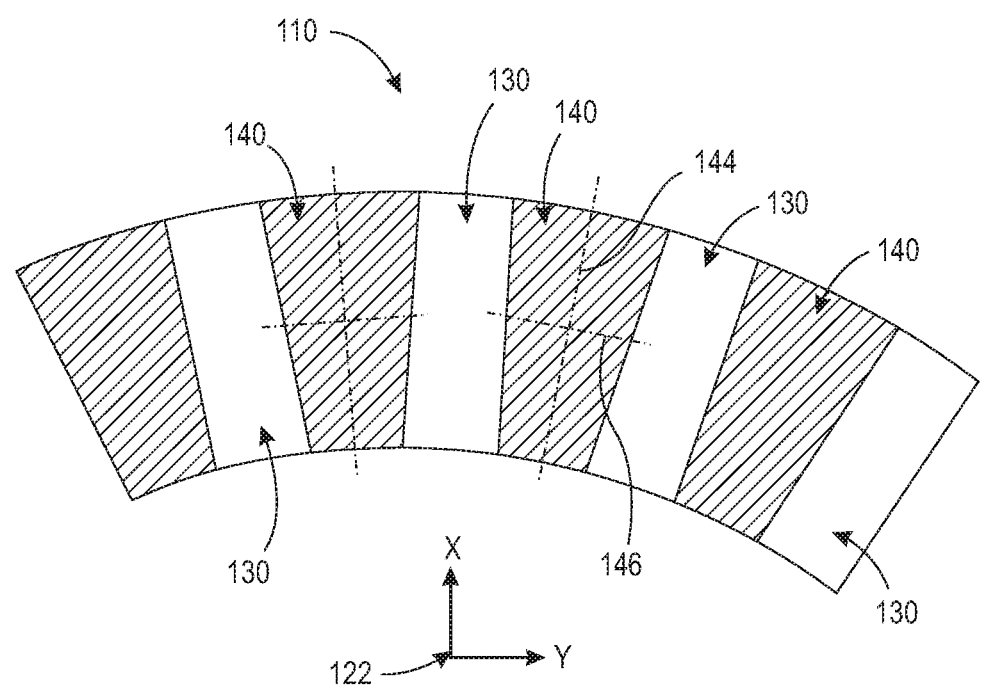
FIG. 9 is an enlarged top view of a portion of the rotor assembly of FIG. 8 including magnetization directions of magnets of the rotor assembly.
Figure 10:
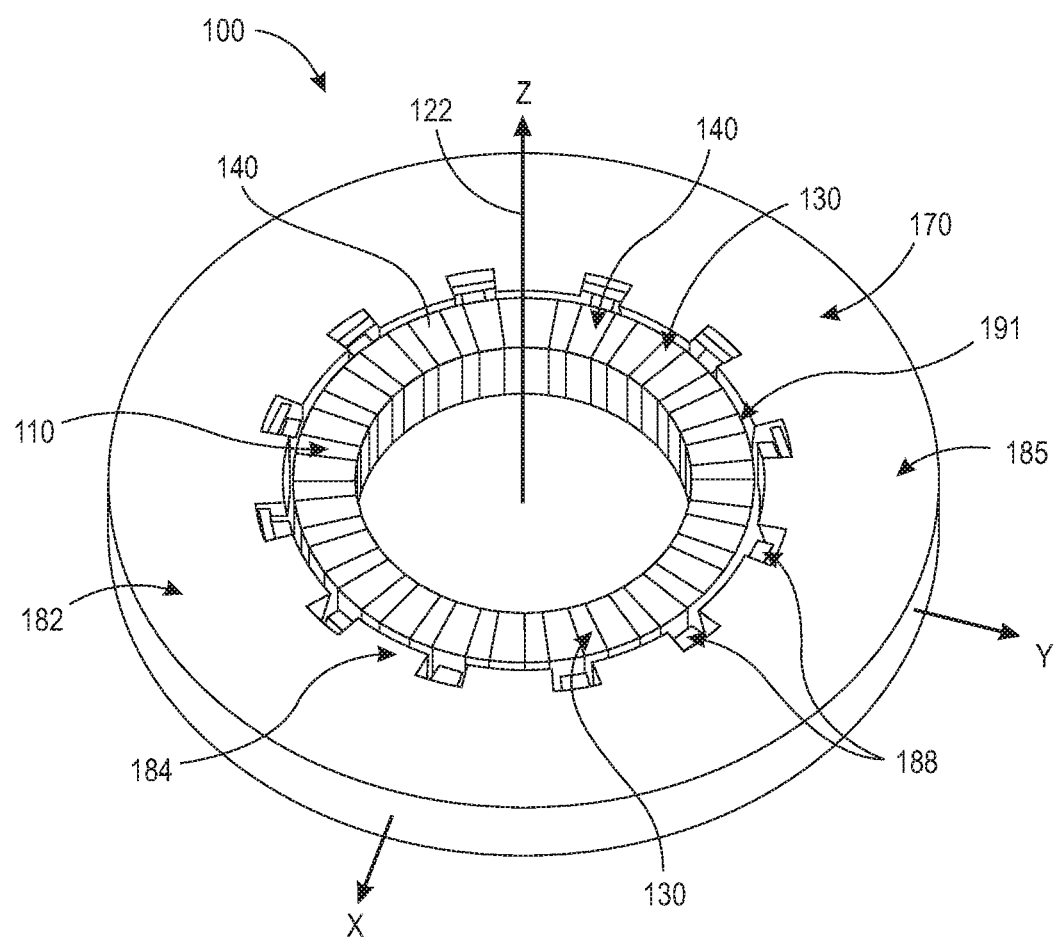
FIG. 10 is a perspective view of a single stack section of the stator assembly and the rotor assembly of FIG. 1.

Each of flux concentrators 130 and magnetic claw poles 140 extend axially along longitudinal axis 122 of rotary shaft 120 and are positioned radially about axis 122 such that each flux concentrator 130 alternates with each magnetic claw pole 140 about rotary shaft 120. As shown in FIG. 9, each magnetic claw pole 140 is orientated on radial center line 144 about axis 122. Crosswise line 146 extends perpendicular to center line 144. As shown in FIG. 10, the magnetization direction of each of magnetic claw poles 140 is perpendicular to center line 144 and is directed towards or away from a corresponding flux concentrator 130 in alternating order. Claw poles 140 may be pre-magnetized or may be assembled in rotor assembly 110 prior to magnetization and then magnetized after assembly. Such post-magnetized claw poles have similar benefits to pre-magnetized claw poles. As such, either type of magnetized claw poles may be utilized in claw-pole motor 100. As shown, in this first embodiment, each flux concentrator 130 has a rectangular cross-section and each magnetic claw pole 140 has a trapezoidal cross-section.

Stator assembly 150 is formed from a plurality of coil assemblies 160. Each coil assembly 160 includes solenoid coil 170 within enclosure assembly 180. Enclosure assembly 180 includes top portion 182 and bottom portion 186. Each of top portion 182 and bottom portion 186 of enclosure assembly 180 has a plurality of inner stator teeth 184 and 188, respectively. As shown, stator teeth 184 of top portion 182 alternate about axis 122 and overlap axially and radially with stator teeth 188 of bottom portion 186 of enclosure assembly 180. An annular space is provided axially between top portion 182 and bottom portion 186 and radially between outer end 183 and inner overlapping teeth 188 and 184 of enclosure assembly 180, and solenoid coil 170 is disposed in such annular space.

Figure 4:
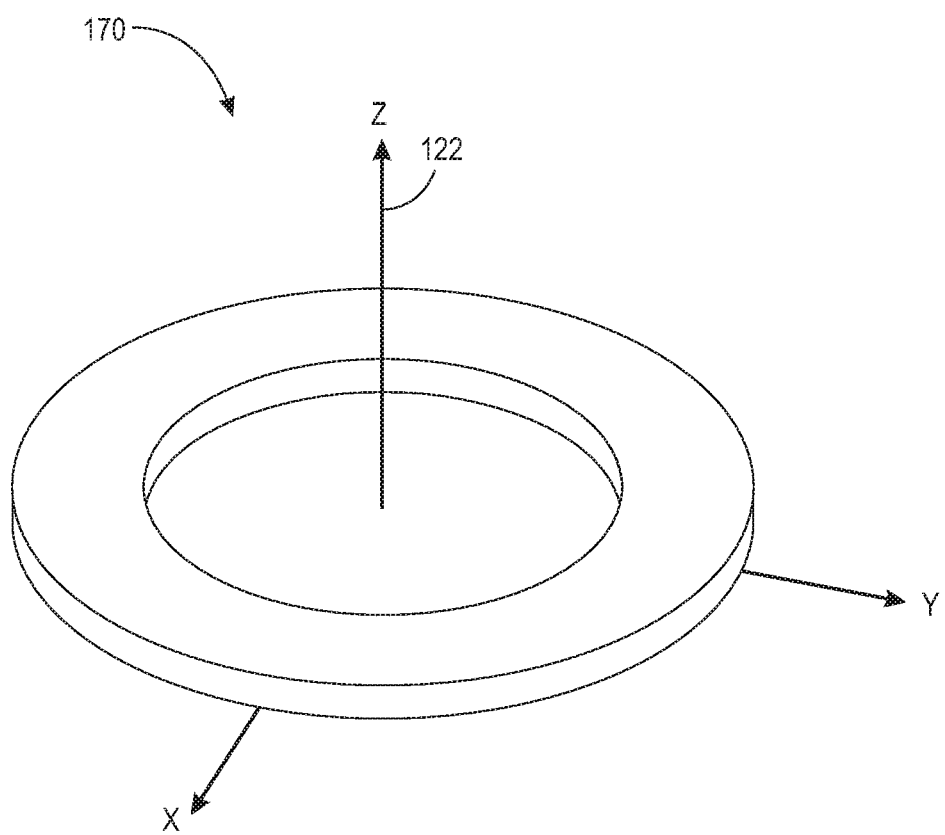
FIG. 4 is a perspective view of a solenoid coil of the coil and enclosure assembly of FIG. 3.
Figure 5:
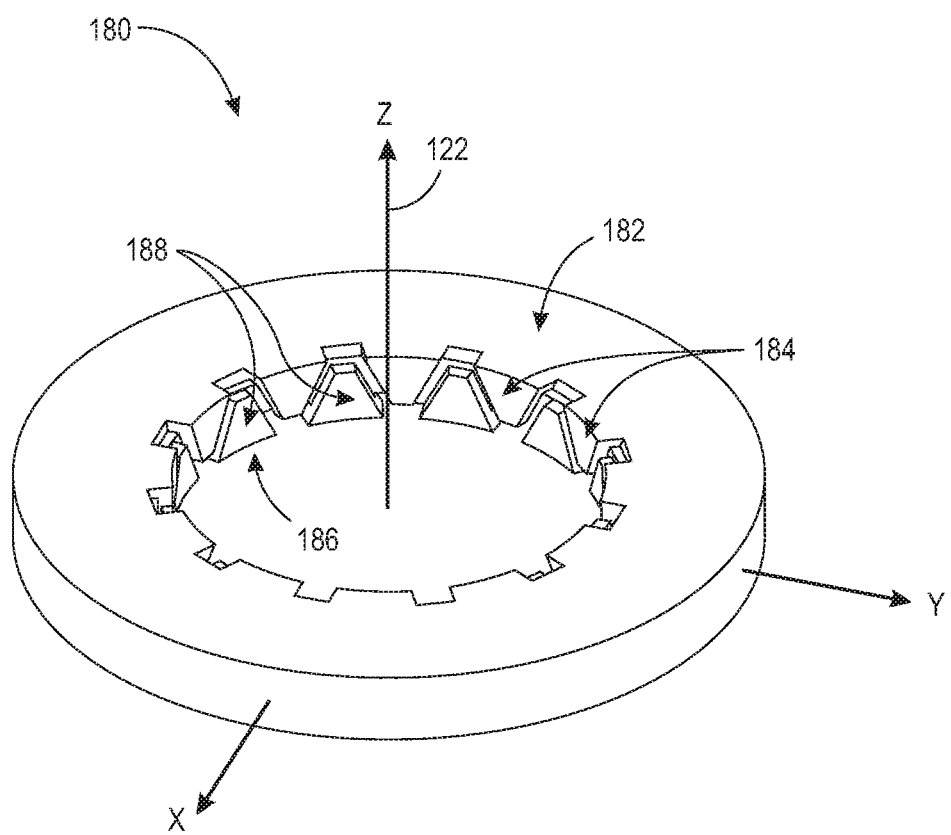
FIG. 5 is a perspective view of a coil enclosure of the coil and enclosure assembly of FIG. 3.
Figure 6:
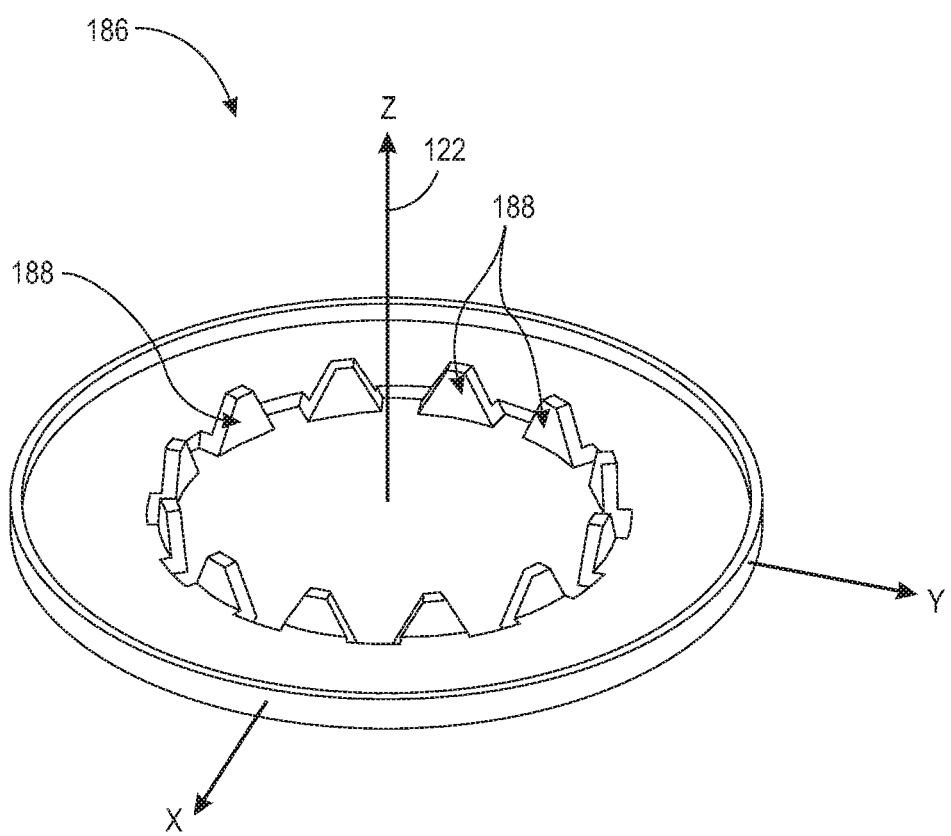
FIG. 6 is a perspective view of a bottom half of the coil enclosure of FIG. 5.
Figure 7:
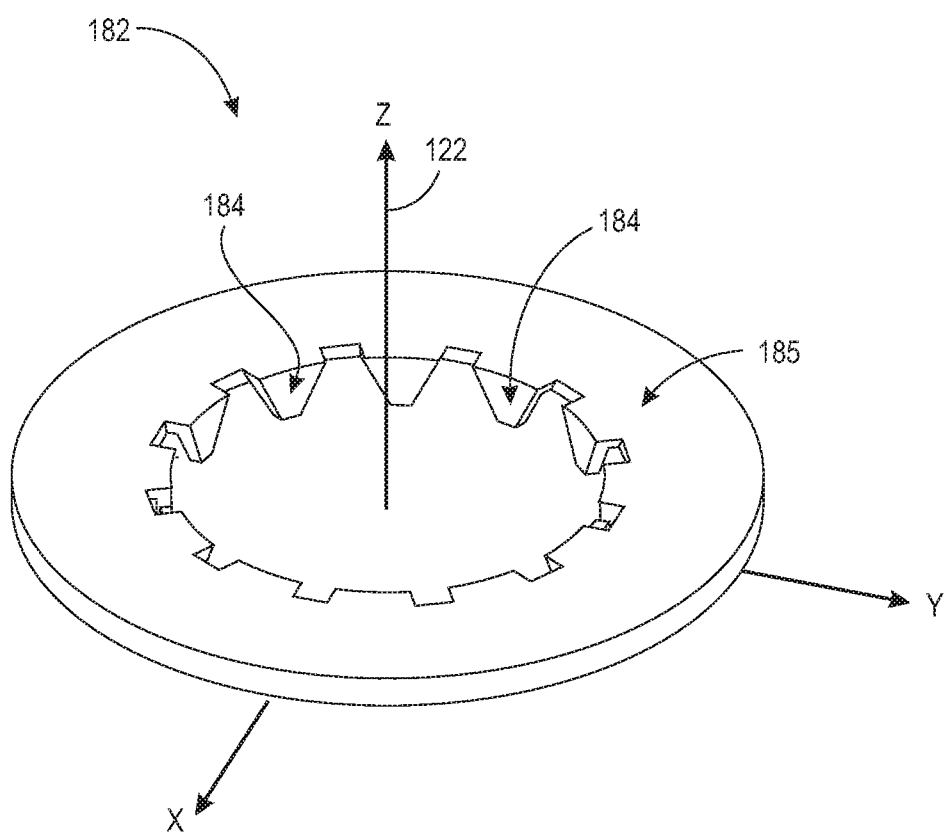
FIG. 7 is a perspective view of a top half of the coil enclosure of FIG. 5.
Figure 8:
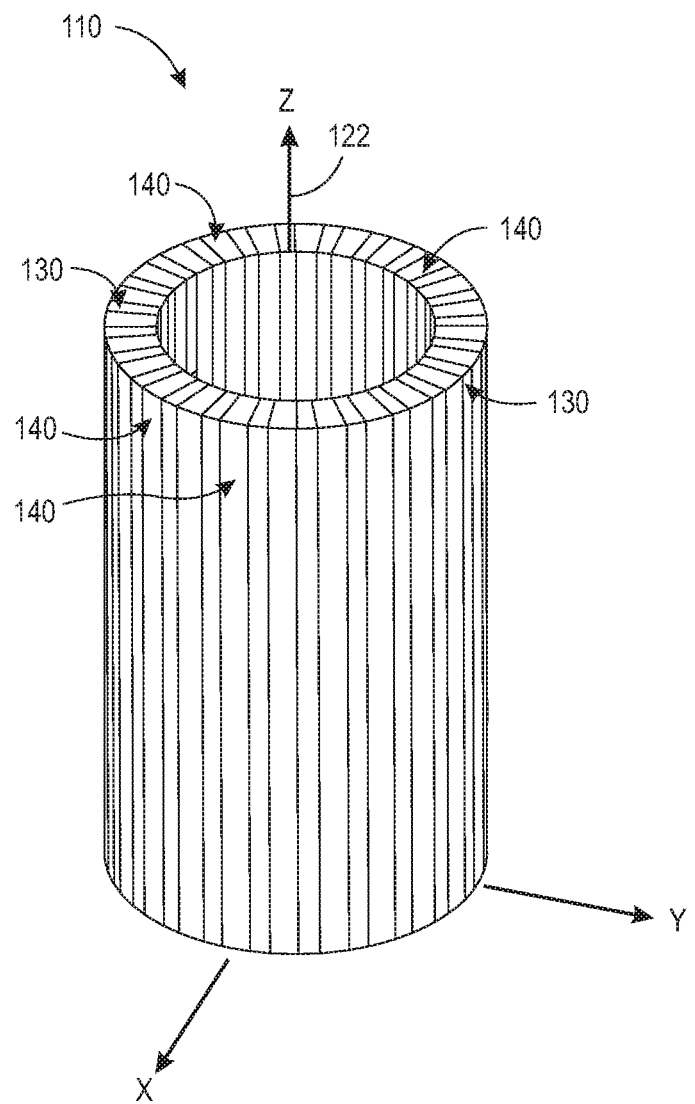
FIG. 8 is a perspective view of the rotor assembly of the claw-pole motor of FIG. 1.

As shown in FIG. 4, solenoid coil 170 is an annular wound coil configured to be received in the annular space of enclosure assembly 180. Solenoidal coil 170 is wound with copper, aluminum wires, ribbons, or any other material suitable for the intended purpose and understood by one of ordinary skill in the art. Solenoid coil 170 provides a number of benefits. Such benefits include, without limitation, allowing for coil-fabrication prior to assembly, allowing for a high-packing factor, eliminating a coil insertion process as required in a traditional motor assembly, and providing for the separation of coils to improve operation fault tolerance and reliability. Stator teeth 184 and 188 both radially and axially overlap each other. Stator teeth 184 and 188 do not radially overlap rotor assembly 110, thereby providing radial air gap 191 therebetween.

Enclosure assemblies 180 and flux concentrators 130 are made with magnetically soft materials. Examples include, without limitation, low carbon steels, silicon steels, iron-cobalt alloys, and molded or additive manufactured (AM) powder iron. Rotor assembly 110 and stator assembly 150 may be made by an additive manufacturing process. For example, rotor assembly 110 may be made by an additive manufacturing process with magnet and iron powder, while stator assembly 150 may be made by an additive manufacturing process with copper and iron powder.

Claw-pole motor 100 may include multiples of three coils for 3-phase motors (e.g. 3, 6, 9, etc.). The minimum number of coils is three coils, with one coil for each of the three phases for a 3-phase motor.

In this first embodiment, claw-pole motor 100 is a 3-phase motor with three coil assemblies 160 for each phase. Motor 100 includes a first set of coil assemblies 160 (A), a second set of coil assemblies 160 (B), and a third set of coil assemblies 160 (C), and the assemblies are arranged in the order of A-B-C, A-B-C, and A-B-C. Each of the first, second, and third sets of coil assemblies (A, B, C) are angularly aligned about axis 122, respectively. Two neighboring coil assemblies 160 may be stacked with or without spacing therebetween. The spacing size effect on motor performance may be minimal.

In this embodiment, an angular alignment degree shift about axis 122 between the adjacent first, second, and third sets of coil assemblies 160 (A, B, C) is defined by:

$$\frac{360°}{(\text{Total sets of coil assemblies} \times \text{Total number of magnetic claw poles})/2}.$$

Figure 2:
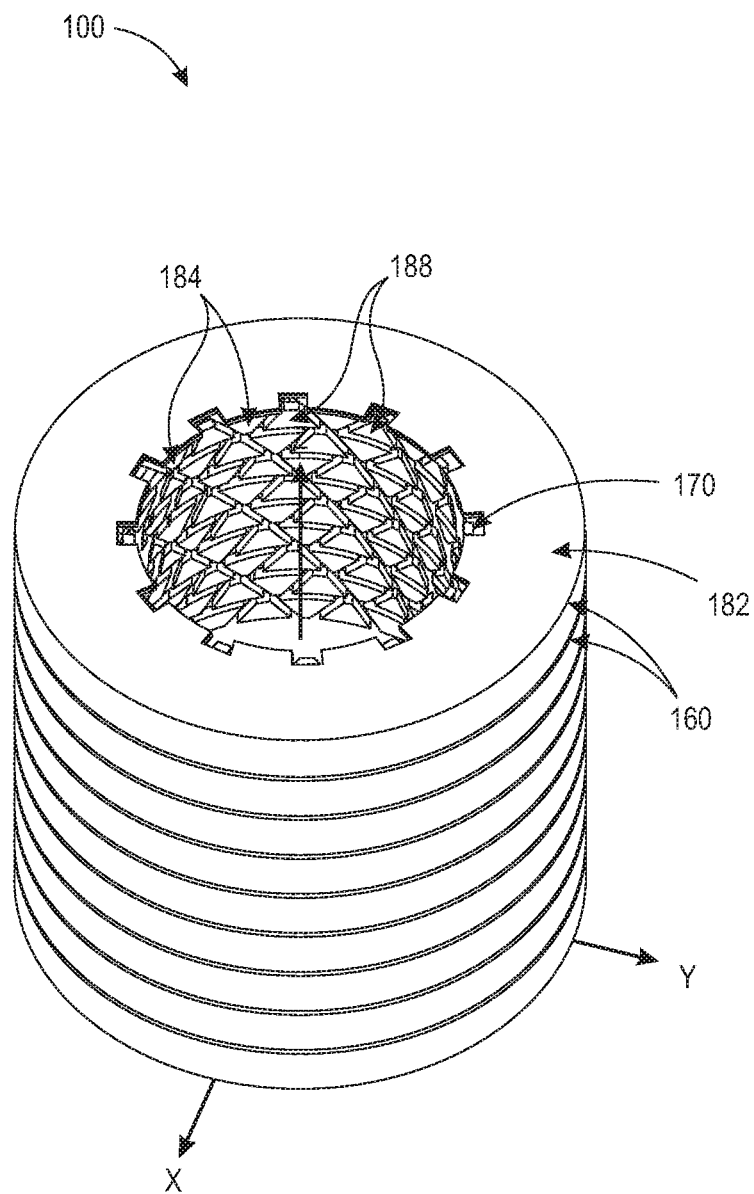
FIG. 2 is a perspective view of the stator assembly of the claw-pole motor of FIG. 1.
Figure 3:
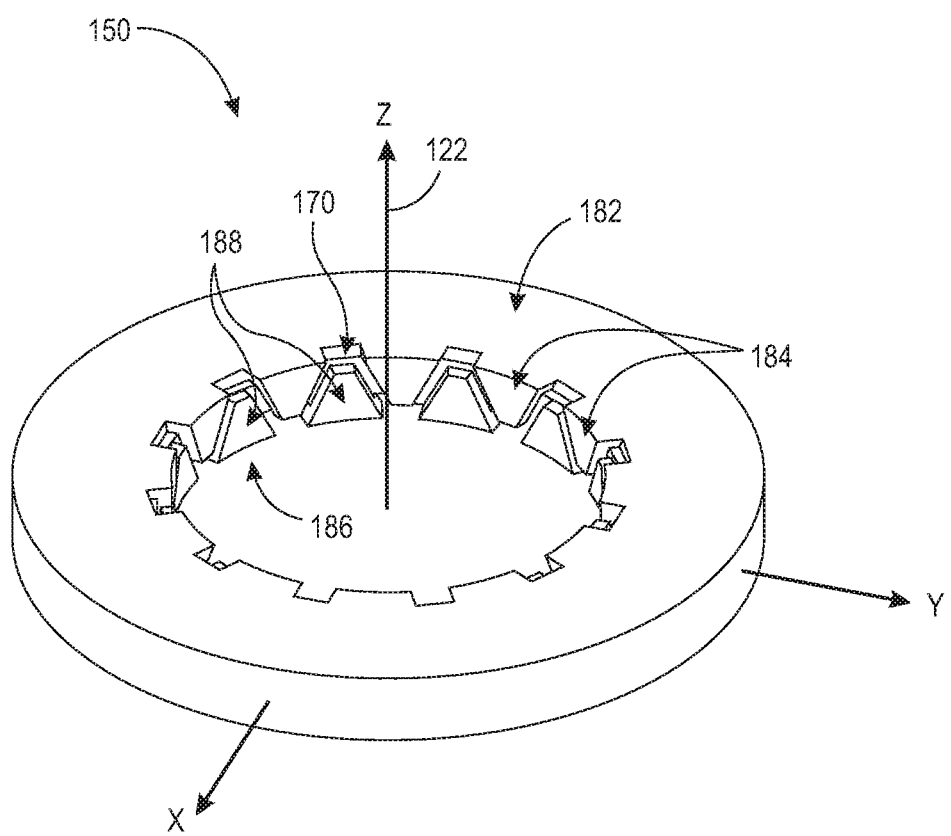
FIG. 3 is a perspective view of a coil and enclosure assembly of the stator assembly of FIG. 2.

Thus, stator teeth 184 and 188 of coil assemblies 160 in FIGS. 2 and 3 are angularly off-set between two neighboring phases by 10 degrees (360°/((3 sets×24 poles)/2)=10°). That is, in an A-B-C 3-phase stator, there is a 10 degree shift between coil assemblies (B) to (A) and a 10 degree shift between coil assemblies (C) to (B). The next group or stack of coil assemblies A-B-C is a repetition of the previous angular alignment. As such, all A-phase stator teeth are in angular alignment about axis 122, and the same for B and C-phase stator teeth, respectively.

In a 60-pole 3-phase motor, the stator teeth degree shift would be 4 degrees (360°/((3 sets×60 poles)/2)=4°), which is between phase A to phase B and phase B to phase C. The next group of coil assembly stacks (A-B-C) would repeat the calculated stator tooth degree shift, while the stator teeth of each phase would be angularly aligned.

Figure 12:
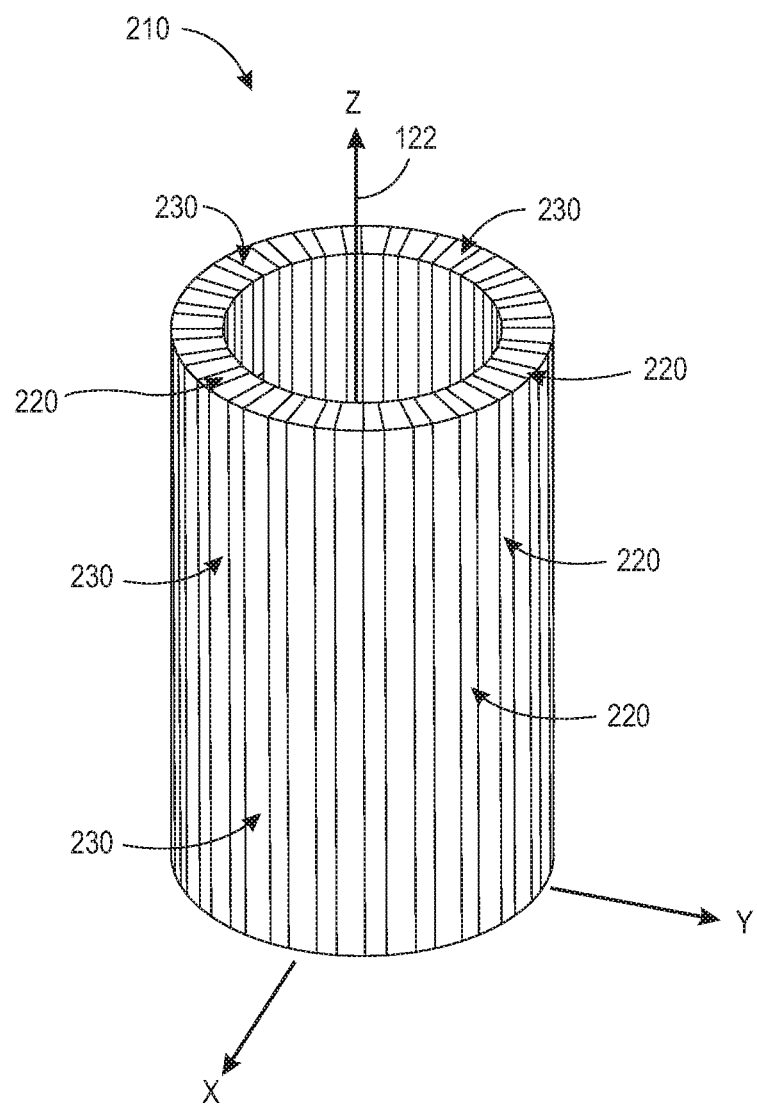
FIG. 12 is a perspective view of a second embodiment of a rotor assembly of the claw-pole motor of FIG. 1.
Figure 13:
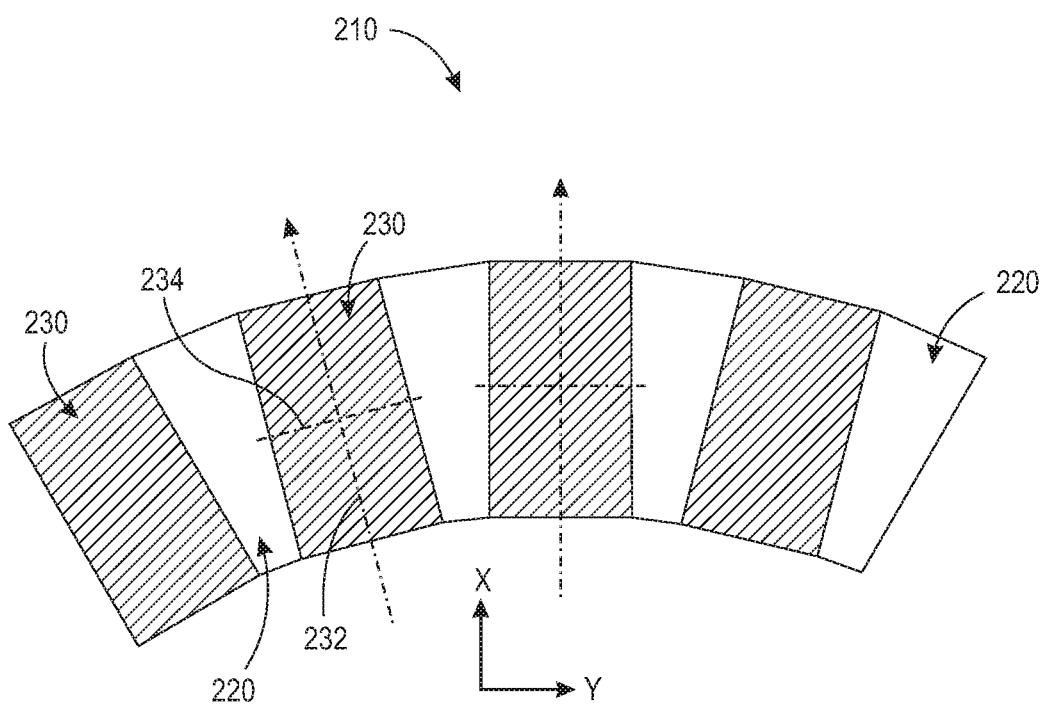
FIG. 13 is an enlarged top view of a portion of the rotor assembly of FIG. 12 including magnetization directions of magnets of the rotor assembly.

FIGS. 12 and 13 show a second embodiment rotor assembly 210. As shown, rotor assembly 210 also includes a plurality of alternating flux concentrators 220 and magnetic claw poles 230 orientated about axis 122. Each of flux concentrators 220 has a trapezoidal cross-section and each of magnetic claw poles 230 has a rectangular cross-section as shown in FIGS. 12 and 13. Each of magnetic claw poles 230 includes longitudinal center line 232 and crosswise line 234 that is perpendicular to longitudinal center line 232. The magnetization direction of each of magnetic claw poles 230 is perpendicular to longitudinal center line 232 and is directed towards or away from a corresponding flux concentrator 220 in an alternating order.

This rotor assembly embodiment 210 may be selected where the use of laminated materials is difficult. Permanent magnets can be brittle and lack mechanical strength. If a long length is required, the permanent magnets are assembled in segments to avoid cracking or breaking. Therefore, the permanent magnets may be made in segments along a vertical length. For example, in a 4-inch long rotor assembly, the permanent magnets can be made with two 2-inch long segments.

In motor embodiment 100, the total number of stator teeth 184 and 188 between top portion 182 and bottom portion 186 of enclosure assembly 180 is equal to the total number of magnetic claw poles 140. Each of top portion 182 and bottom portion 186 of enclosure assembly 180 has twelve triangular stator teeth that are positioned in alternating order. A first length between adjacent stator teeth of top portion 182 and bottom portion 186 of enclosure assembly 180 may be more than twice a second length between rotor assembly 110 and stator assembly 150. For example, neighboring triangular stator teeth may be separated by a space that is twice the size of the motor radial air gap or larger (spacing between neighboring stator teeth≥2×motor radial air gap size). Such spacing ensures magnetic flux flow, shown in FIG. 11, in coil assembly 160 through the back from one stator tooth to the two neighboring stator teeth.

Figure 11:
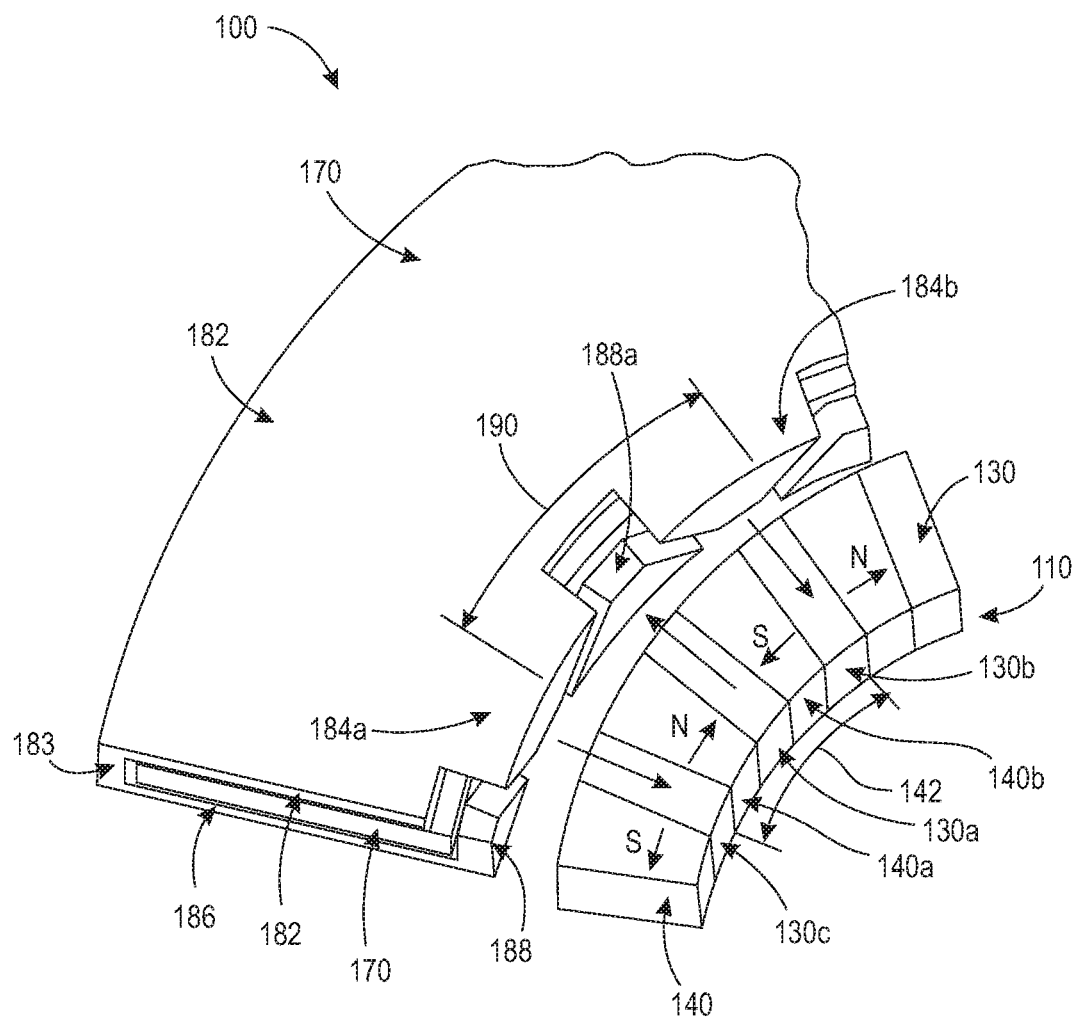
FIG. 11 is an enlarged perspective view of a portion of the single stack section of the stator assembly and the rotor assembly of FIG. 10.

As shown in FIG. 11, rotor assembly 110 comprises magnetic claw-pole angular pitch 142. Enclosure assembly 180 of stator assembly 150 comprises stator teeth angular pitch 190. In this embodiment, magnetic claw-pole angular pitch 142 comprises four pieces, namely two neighboring magnets 140a and 140b, with flux concentrator 130a in between the two neighboring magnets 140a and 140b, and either one of the two flux concentrators 130b or 130C that are next to the two neighboring magnets 140a and 140b. One of the two neighboring magnets 140a is magnetized in the North direction, while the other neighboring magnet 140b is magnetized in the South direction. This allows for magnetic claw-pole angular pitch 142 to be 30 degrees for a 24-pole motor as shown in FIGS. 1, 8, 10, and 11.

As shown in FIG. 11, in this embodiment, stator teeth angular pitch 190 comprises two neighboring stator teeth 184, 188, with stator tooth 184 from top portion 182 and stator tooth 188 from bottom portion 186 of enclosure assembly 180. This allows stator teeth angular pitch 190 to be 30-degrees for the 24-pole motor in FIGS. 1-3, 5, 10, and 11. As such, in this embodiment magnetic claw-pole angular pitch 142 is equal to stator teeth angular pitch 190.

This contradicts traditional motor design where the highest least common multiple (LCM) of the number of stator teeth (slots) and rotor poles is desired to minimize cogging torque and running torque ripples. For example, one known low cogging and low torque ripple design for a 12-pole motor has 39 stator teeth, making the LCM equal 156. In contrast, the LCM of claw-pole motor 100 equals 12.

Directional magnetic pull is:

$$\text{Magnetic pull} = \frac{\text{Number of stator teeth} \times \text{Number of rotor poles}}{\text{LCM}(\text{Number of stator teeth}, \text{Number of rotor poles})} = 12.$$

In this embodiment, the radial force between rotor assembly 110 and stator assembly 150 is distributed equally at 12 locations in the air gap circumference. This compares to the above example of a 12-pole/39-slot motor that has 3 (39× 12/156=3), such that radial forces are concentrated at three locations and 120-degrees apart in the air gap circumference. Therefore, claw-pole motor 100 offers less motor bearing wear and better bearing life.

As shown in FIG. 11, in this embodiment, magnetic flux flows from first flux concentrator 130a to first stator tooth 188a of coil assembly 160. The magnetic flux flows from second stator tooth 184a and third stator tooth 184b of coil assembly 160 to second flux concentrator 130c and third flux concentrator 130b of the plurality of flux concentrators, respectively, essentially wrapping around solenoid coil 170 and linking the coil excitation flux. The second stator tooth and the third stator tooth may be adjacent to the first stator tooth, and the second flux concentrator and the third flux concentrator may be adjacent to the first flux concentrator.

Enclosure assembly 180, stator teeth 184 and 188, flux concentrators 130, and their respective materials capture the most magnetic flux in claw-pole motor 100, maximize the flux linkage between solenoid coil 170 and rotor assembly 110, prevent magnetic flux leakage, short-circuit, and magnetic saturations, reduce losses from eddy current, hysteresis, iron and copper, and minimize manufacturing costs.

In addition to concentrating and directing magnetic flux to the stator teeth, rotor flux concentrators 130 also enable the use of non-magnetic rotor shaft 120 and eliminate the rotor hub and/or rotor hub and shaft of magnetic steel, as required in traditional surface-mounted permanent magnet (SPM) motors. In applications where a shaft position feedback is required, the non-magnetic rotary shaft will not interfere with the position feedback device, as in the case with a magnetic rotary shaft.

Solenoid coils 170 and enclosure assemblies 180 are stacked axially in a repeating pattern with an angular shift among the motor phases. Low cogging torque and low torque ripples can be achieved for flux concentrators 130 and stator teeth 184 and 188.

Figure 14:
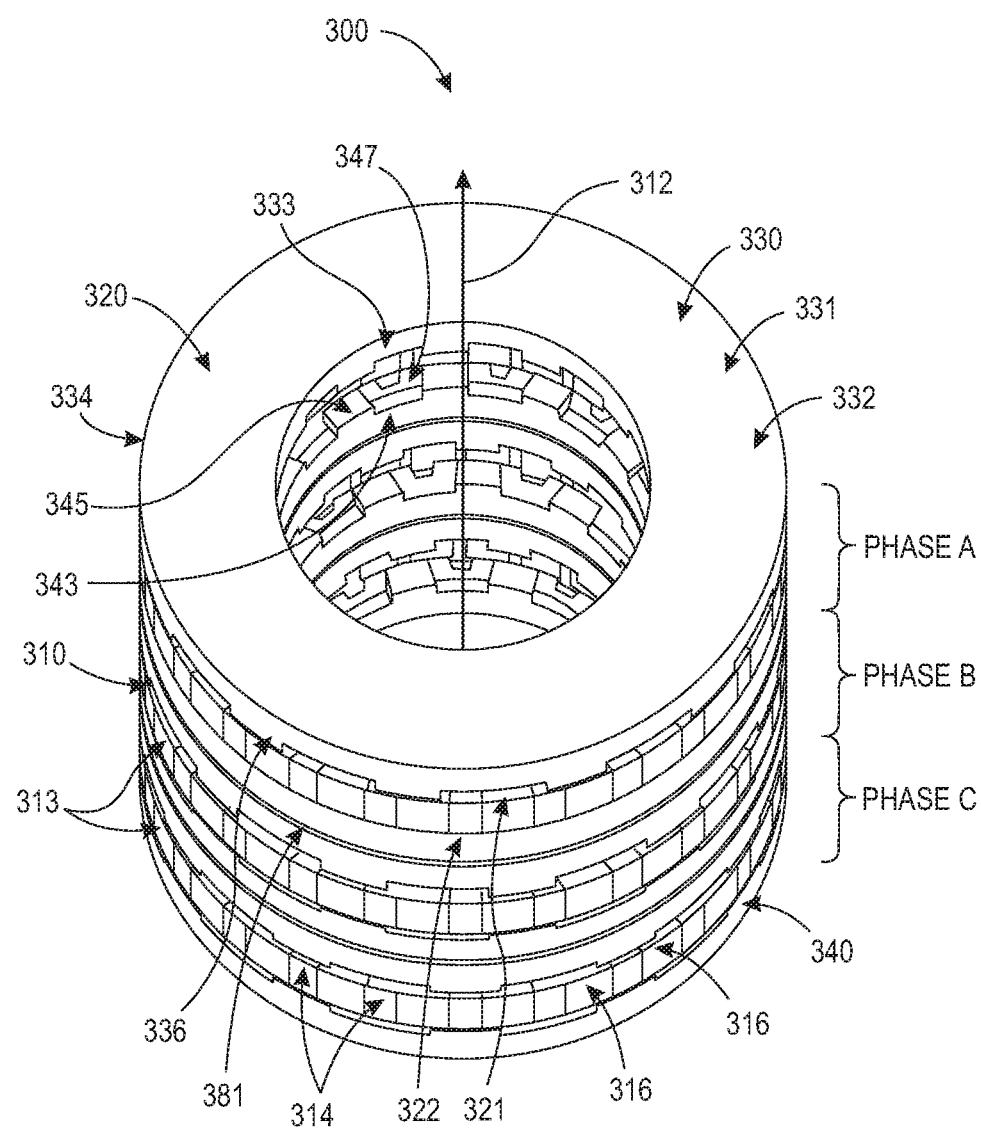
FIG. 14 is a perspective view of a second embodiment of a claw-pole motor having an improved stator assembly and rotor assembly.
Figure 15:
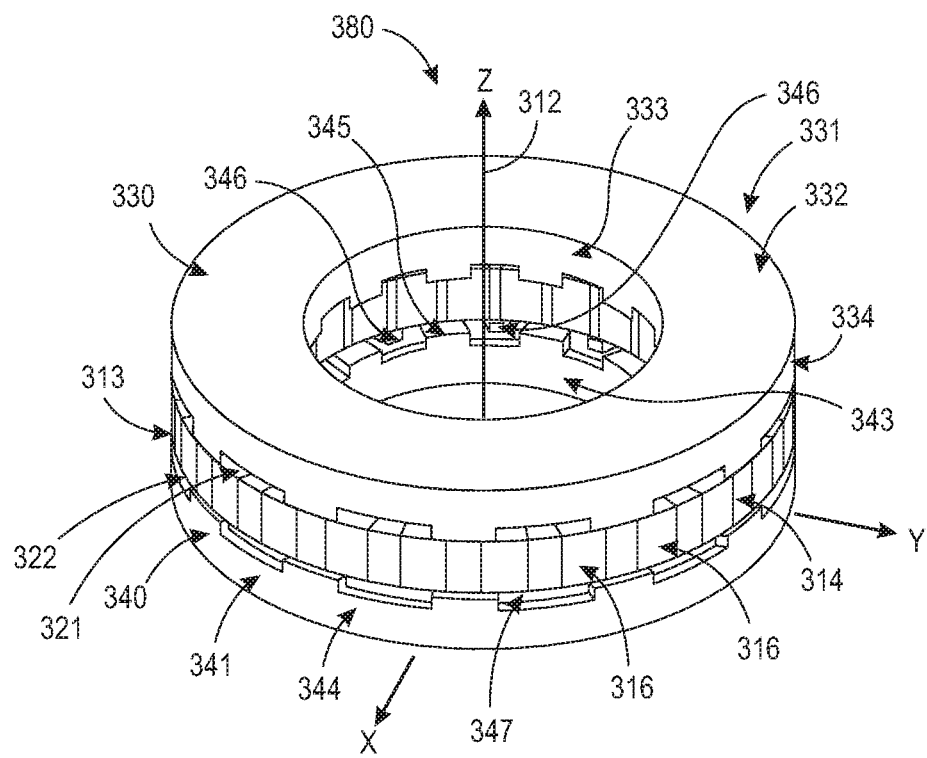
FIG. 15 is a perspective view a single stack of the stator assembly and the rotor assembly of the claw-pole motor of FIG. 14.
Figure 16:
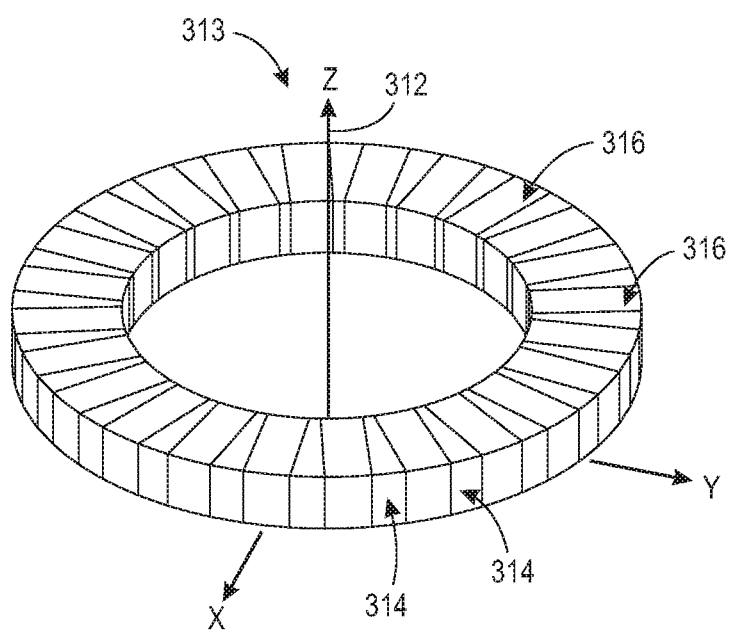
FIG. 16 is a perspective view of a rotor disc of the rotor assembly of the claw-pole motor of FIG. 14.

A second embodiment claw-pole motor 300 is shown in FIGS. 14-22. Claw-pole motor 300 is shown as broadly including rotor assembly 310 and stator assembly 320. Stator assembly 320 comprises a plurality of stacked coil enclosure assemblies 380. Rotor assembly 310 is configured to rotate about axis 312 and includes a non-magnetic rotary shaft and a plurality of rotor discs 313. Each of rotor discs 313 includes a plurality of flux concentrators 314 and a plurality of magnetic claw poles 316, as shown in FIG. 16. The thickness of each rotor disc 313 may be approximately 0.34 inches, as may be the thickness of each coil assembly. A total thickness of a single stack of a single rotor assembly 310 and coil enclosure assembly 380, as shown in FIG. 15, may be approximately 1.08 inches, including two annular axial air gaps 321 and 322 of approximately 0.030 inches between rotor disc 313 and coil enclosure assembly 380. Assembly 320 may have an outer diameter of 6.5 inches and an inner diameter of 3.6 inches. The radial air gap between rotor assembly 310 and the inner diameter of stator assembly 320 may be approximately 0.030 inches. The inner diameter of rotor assembly 310 may be approximately 2.5 inches.

Similar to claw-pole motor 100, flux concentrators 314 and magnetic claw poles 316 are positioned such that each flux concentrator 314 alternates with each magnetic claw pole 316 about axis 312 and the rotary shaft. Each magnetic claw pole 316 includes a longitudinal center line and crosswise line that is perpendicular to the longitudinal center line. The magnetization direction of each magnetic claw pole 316 is perpendicular to its longitudinal center line. The magnetization direction of each magnetic claw pole 316 is directed towards or away from a corresponding flux concentrator 314 in alternating order. Magnetic claw poles 316 are magnetized perpendicular to each pole. The magnetic claw poles 316 may be assembled in rotor assembly 310 prior to magnetization and then magnetized after assembly or may be pre-magnetized.

Figure 17:
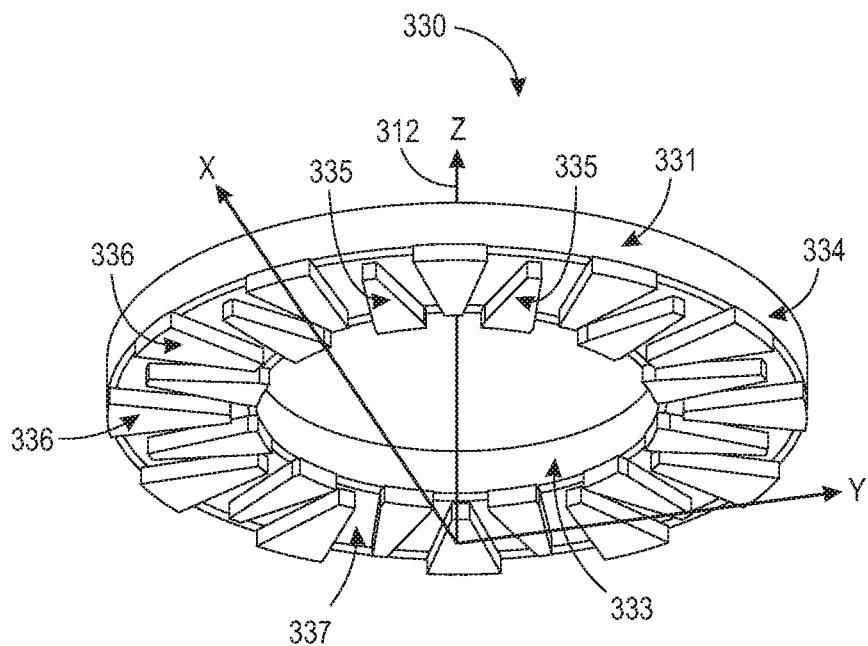
FIG. 17 is a perspective view of a first coil assembly of the stator assembly of FIG. 15.
Figure 18:
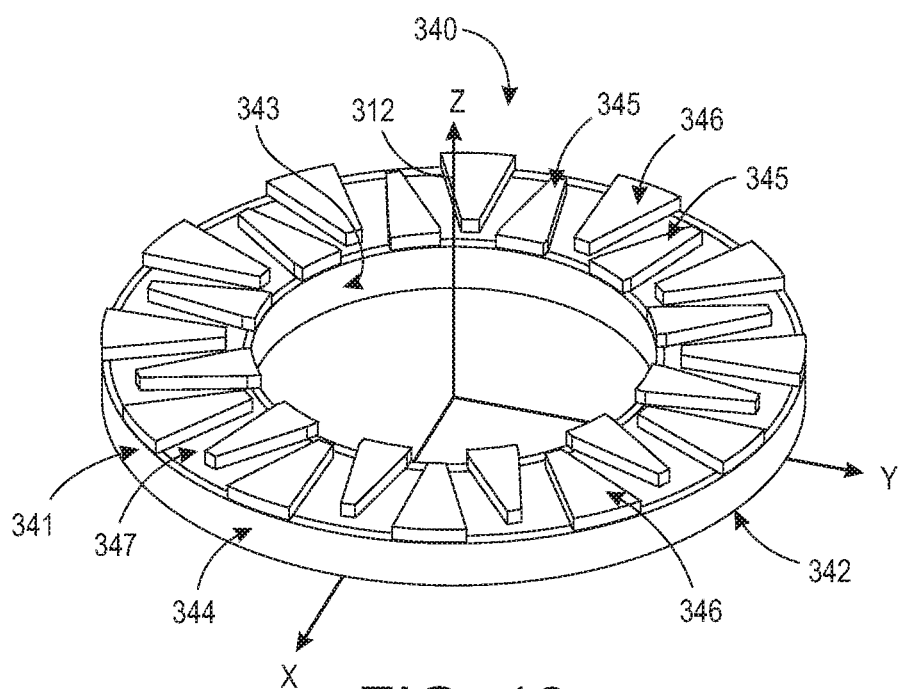
FIG. 18 is a perspective view of a second coil assembly of the stator assembly of FIG. 15.
Figure 19:
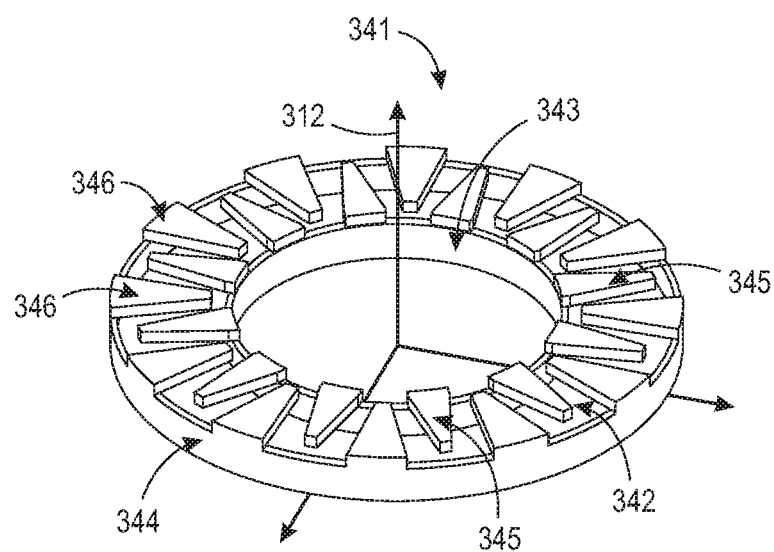
FIG. 19 is a perspective view of an enclosure assembly of the second coil assembly of FIG. 18.

Stator assembly 320 includes a plurality of stacked coil assemblies 330 and 340, as shown in FIGS. 17 and 18. Coil assembly 330 includes enclosure assembly 331 and solenoid coil 337. Enclosure assembly 331 includes base 332, inner wall 333, outer wall 334, outward-facing stator teeth 335, and inward-facing stator teeth 336. Inward-facing stator teeth 336 both radially and axially overlap outward-facing stator teeth 335. Inward-facing stator teeth 336 and outward-facing stator teeth 335 do not axially overlap rotor disc 313. Inward-facing stator teeth 336 and outward-facing stator teeth 335 do radially overlap rotor disc 313, thereby providing axial air gap 321 therebetween. Inward-facing stator teeth 336 may be larger than outward-facing stator teeth 335 because of the difference between the outer stator circumference and the inner stator circumference. For example, the width of inward-facing stator teeth 336 may be about 0.38 inches at the stator outer circumference and the width of outward-facing stator teeth 335 may be 0.25 inches at the stator inner circumference.

Coil assembly 340 includes enclosure assembly 341 and solenoid coil 347. Enclosure assembly 341 includes base 342, inner wall 343, outer wall 344, outward-facing stator teeth 345, and inward-facing stator teeth 346. Inward-facing stator teeth 346 both radially and axially overlap outward-facing stator teeth 345. Inward-facing stator teeth 346 and outward-facing stator teeth 345 do not axially overlap rotor disc 313. Inward-facing stator teeth 346 and outward-facing stator teeth 345 do radially overlap rotor disc 313, thereby providing axial air gap 322 therebetween.

Figure 20:
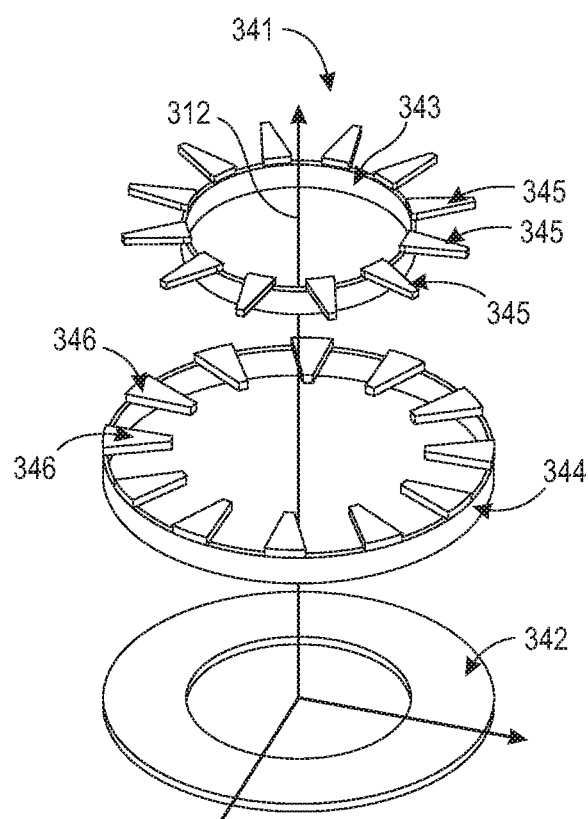
FIG. 20 is a perspective exploded view of a first embodiment of the enclosure assembly of FIG. 19.
Figure 21:
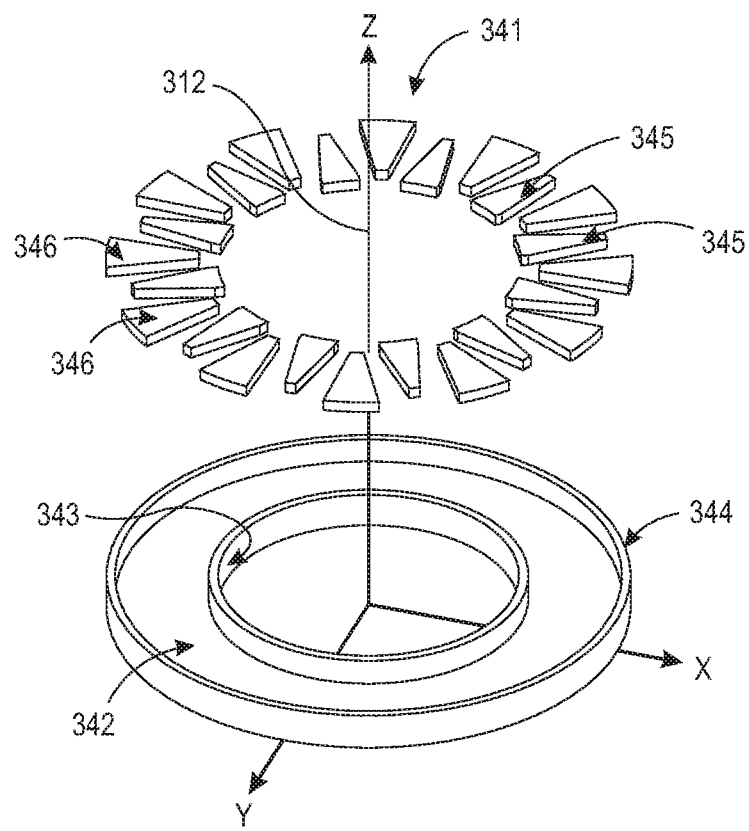
FIG. 21 is a perspective exploded view of a second embodiment of the enclosure assembly of FIG. 19.

Enclosure assembly 331 and enclosure assembly 341 may be fabricated from three parts (as shown in FIG. 20) or from two parts (as shown in FIG. 21), which includes the stator teeth and the walls and base of the enclosure assembly. For example, as shown in FIG. 20, enclosure assembly 341 is fabricated from three pieces, namely base 342, outer wall 344 together with inward-facing stator teeth 346, and inner wall 343 together with outward-facing stator teeth 345. In this embodiment, inward-facing stator teeth 346 extend inwardly from outer wall 344 and outward-facing stator teeth 345 extend outwardly from inner wall 343. In the second embodiment shown in FIG. 21, enclosure assembly 341 is fabricated from two pieces, with base 342, inner wall 343, and outer wall 344 form one piece, while outward-facing stator teeth 345 and inward-facing stator teeth 346 form the other collective piece. In this two-piece embodiment, outward-facing stator teeth 345 and inward-facing stator teeth 346 may be molded in non-magnetic materials such as epoxy.

The number of outward-facing stator teeth 335 and inward-facing stator teeth 336 of enclosure assembly 331 and outward-facing stator teeth 345 and inward-facing stator teeth 346 of enclosure assembly 341 may be equal to the number of magnetic claw poles of rotor disc 313 of rotor assembly 310. Each of outward-facing stator teeth 335 and 345 and inward-facing stator teeth 336 and 346 may have twelve triangular stator teeth that are positioned in an alternating order about axis 312. A first length between adjacent stator teeth of outward-facing stator teeth 335 and 345 and inward-facing stator teeth 336 and 346 may be more than twice a second length between rotor assembly 310 and stator assembly 320. For example, neighboring triangular stator teeth 335, 336, 345, and 346 may be separated by a space that is twice the size of the motor radial air gap or larger (spacing between neighboring stator teeth≥2×motor radial air gap size).

Claw-pole motor 300 is a modified 3-phase claw-pole motor with two axial annular air gaps 321 and 322 for each phase. As shown in FIG. 14, each phase of modified 3-phase claw-pole motor 300 (shown with the rotary shaft removed) includes two axial annular air gaps 321 and 322 in a plane perpendicular to the Z-axis. In this embodiment, claw-pole motor 300 includes three rotor sections 313 and three stator sections 380. Rotor poles 316 are aligned about the Z-axis. Outward-facing stator teeth 335 and inward-facing stator teeth 336 among the 3-phases are shifted in the X-Y plane so that the angular alignments about the Z-axis are similar to the equation above for claw-pole motor 100:

$$\text{Stator teeth alignment shift} = \frac{360°}{\text{Number of phases} \times \text{Number of poles}/2}$$

For example, for a 24-pole 3-phase motor, the stator teeth shift is 10 degrees (360°/(3×24/2)=10°) in between Phase A to Phase B and between Phase B to Phase C, as shown in FIG. 14. The next group of A-B-C stacks will repeat the stator teeth shift and the stator teeth of each phase (e.g., A, B, and C) will be angularly aligned.

Referring to FIGS. 15-18 and 22, a single stack 380 of rotor assembly 310 and stator assembly 320 of claw-pole motor 300 for one phase is shown. Stator assembly 320 includes coil assembly 330 (FIG. 17) and coil assembly 340 (FIG. 18) being positioned as a mirror image on both sides of rotor disc 313 (FIG. 16) so that outward-facing stator teeth 335 and inward-facing stator teeth 336 of first coil assembly 330 and outward-facing stator teeth 345 and inward-facing stator teeth 346 of second coil assembly 340 are aligned in the Z-axis.

Figure 22:
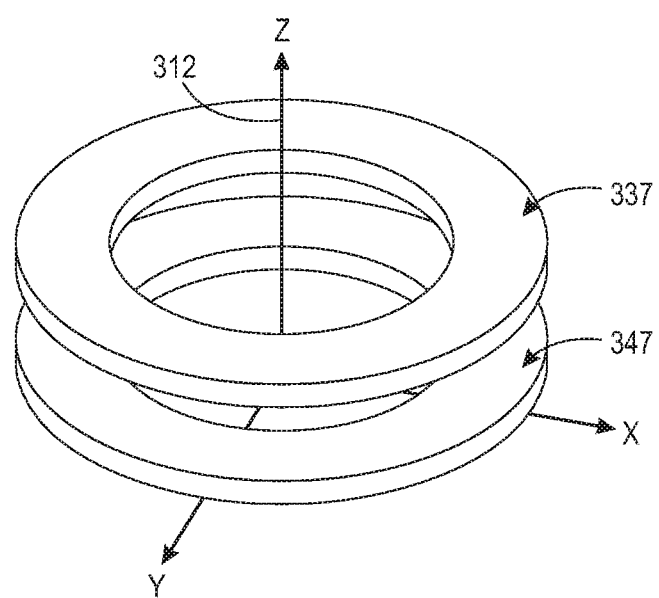
FIG. 22 is a perspective view of solenoid coils of the first and second coil assemblies of FIGS. 15, 17, and 18

In one embodiment, all axial air gaps are 0.030 inches, including each air gap 321 and 322 between rotor disc 313 and neighboring stator coil assemblies 330 and 340, respectively, and axial air gap 381 between two adjacent rotor/stator stack sections. Air gap 381 between adjacent rotor/stator stacks minimizes the magnetic flux interaction of two motor phases. Magnetic flux interaction exists in axial flux motor 300 shown in FIGS. 14-18, whereas in radial flux motor 100 of FIGS. 1-13, there is little to no magnetic flux interaction between neighboring coil enclosure assemblies 180. As such, axial flux motor 300 utilizes axial spacing while radial flux motor 100 does not. The direction of the current of first solenoid coil 337 and second solenoid coil 347 are in the opposite directions in the X-Y plane as shown in FIG. 22.

Similar to claw-pole motor 100, each flux concentrator 314 has a rectangular cross-section and each magnetic claw pole 316 has a trapezoidal cross-section. In another embodiment, each flux concentrator may have a trapezoidal cross-section and each magnetic claw pole may have a rectangular cross-section. This embodiment may be selected where the use of laminated materials is difficult. Permanent magnets can be brittle and lack mechanical strength. If a long length is required, the permanent magnets may be assembled in segments to avoid cracking or breaking. Therefore, the permanent magnets 316 may be made in segments along a vertical length.

Referring to FIGS. 23-28, claw-pole motor 300 is shown in a third embodiment having a plurality of external concentric coil assemblies 350. In this embodiment, claw-pole motor 300 includes both axial air gaps 321, 322, and 381 between rotor assembly 310 and coil assemblies 330 and 340, and radial air gap 360 between rotor assembly 310 and coil assemblies 350. Also, insert motor lead wires of claw-pole motor 300 may exit internally through the rotary shaft.

Figure 23:
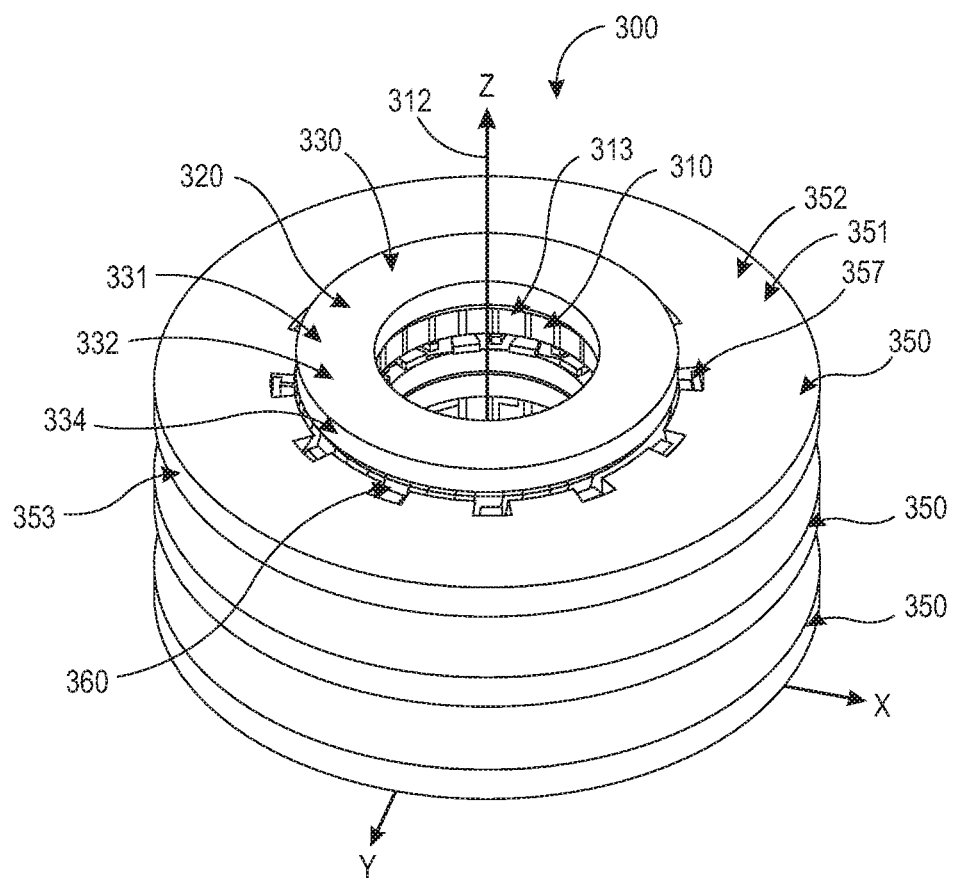
FIG. 23 is a perspective view of a third embodiment of a claw-pole motor having an improved stator assembly and rotor assembly.
Figure 24:
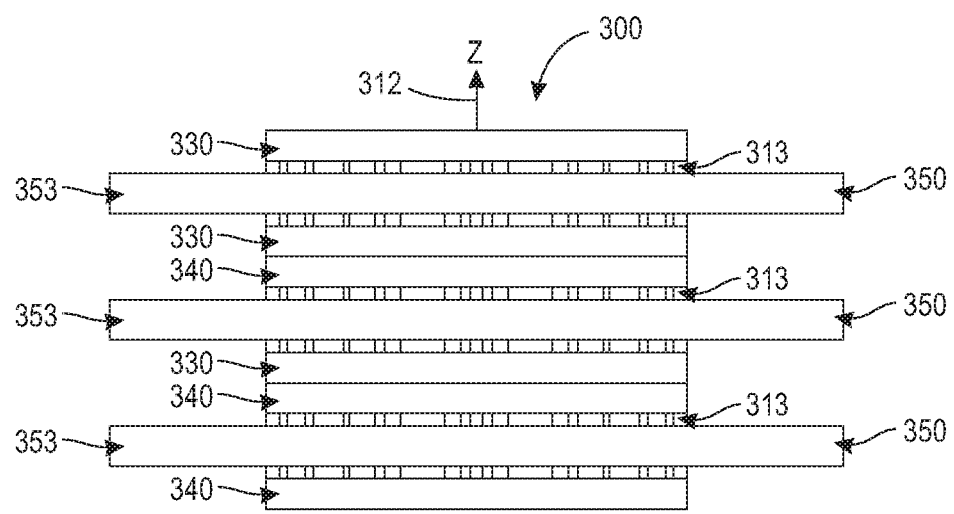
FIG. 24 is a side view of the claw-pole motor and the external coil assemblies of FIG. 23.
Figure 25:
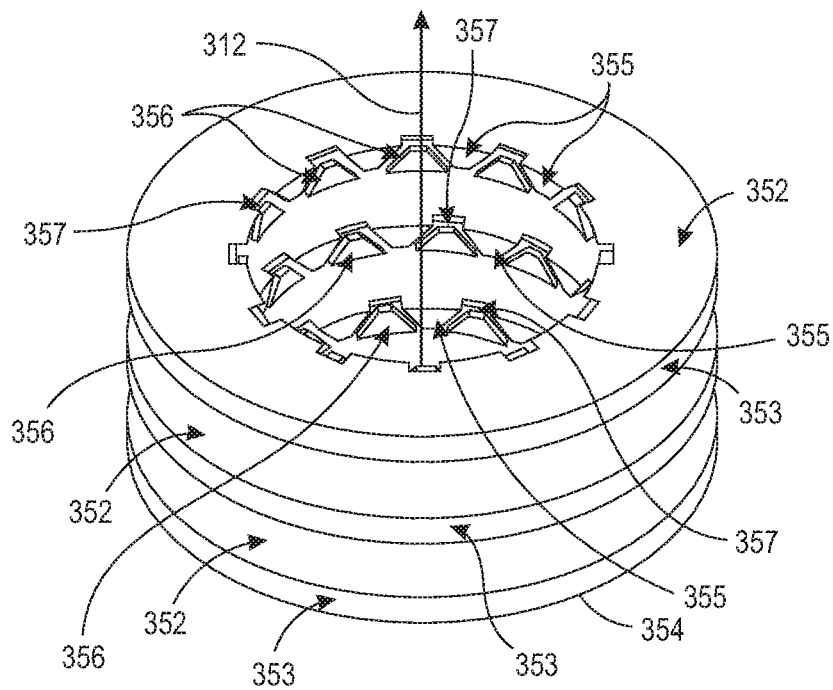
FIG. 25 is a perspective view of the external coil assemblies of FIG. 23.
Figure 26:
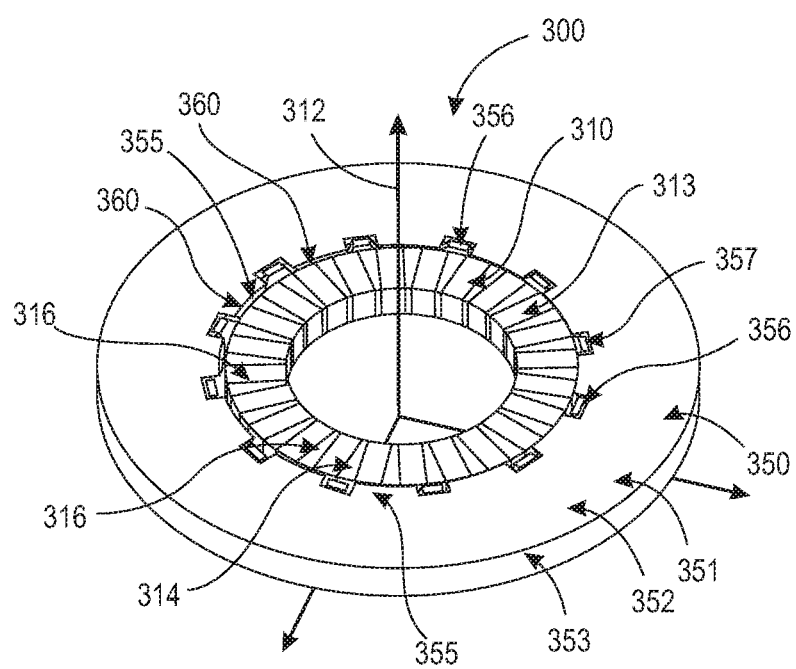
FIG. 26 is a perspective view of a rotor disc and an external coil assembly of the claw-pole motor of FIG. 23.

Each coil assembly 350 includes enclosure assembly 351 and solenoid coil 357. Enclosure assembly 351 includes top portion 352, outer sidewall 353, bottom portion 354, downward-facing stator teeth 355, and upward-facing stator teeth 356. The material, construction, positioning, and orientation of third enclosure assembly 351 of claw-pole motor 300 is similar to enclosure assembly 180 of claw-pole motor 100 as previously described. In FIGS. 23-25, claw-pole motor 300 is shown having three external stacked coil assemblies 350. Each external coil assembly 350 may be positioned to engage a corresponding rotor disc 313, similar to the engagement between rotor assembly 110 and coil assembly 160 of claw-pole motor 100 as described above and shown in FIGS. 10 and 11. FIG. 26 illustrates a single stack of rotor disc 313 and coil assembly 350 aligned axially in the Z-axis 312 and concentrically about axis 312.

Figure 27:
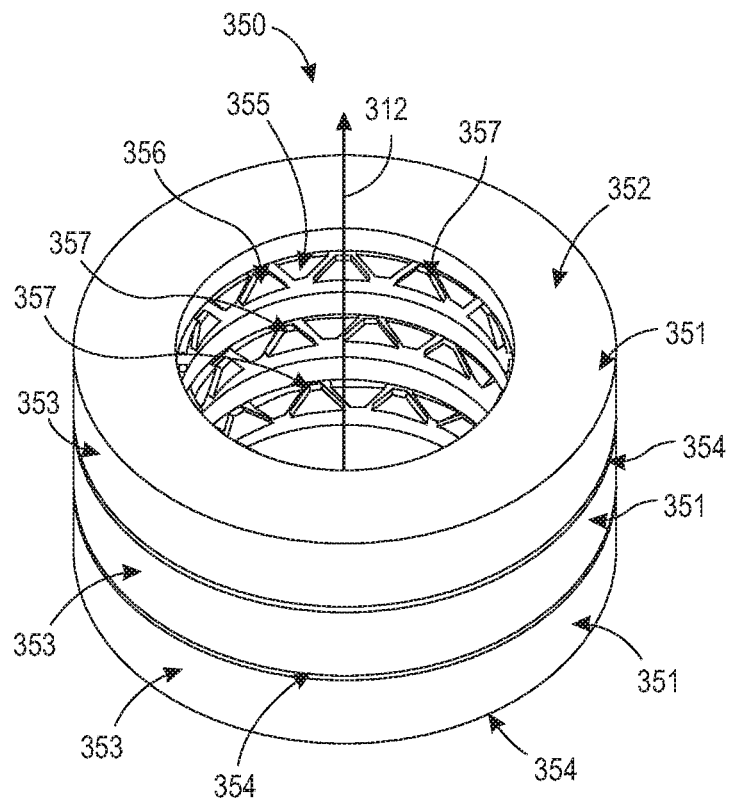
FIG. 27 is a perspective view of a second embodiment of the external coil assemblies of FIG. 23.
Figure 28:
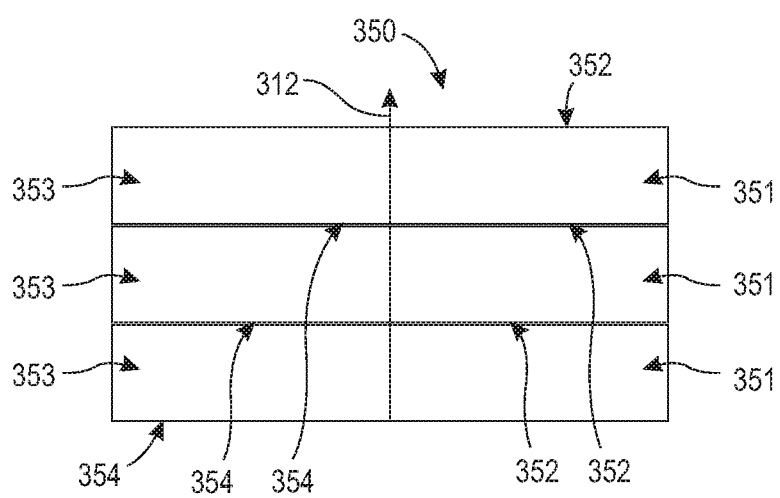
FIG. 28 is a side view of the external coil assemblies of FIG. 27.

Referring to FIGS. 27 and 28, claw-pole motor 300 is shown in an embodiment having larger external coil assemblies 350, which utilize the available space in between two neighboring external coil assemblies 350. In this embodiment, coil assembly 350 has a larger cross-section that provides more winding space for more coil turns or coil resistance reduction. In both embodiments of external concentric coil assemblies 350, two neighboring coil assemblies 350 may be stacked with or without spacing in between them. The spacing size effect on motor performance is minimal.

Features and benefits of the improved claw-pole motors include phase isolation and no overlap among phases and end turns, a feature that is highly desired for high reliability for aerospace and extreme environment applications. Redundant motors can be easily built by stacking without any motor design modification. With no end-turns, the length of the coil contributes to the motor torque production for a more efficient motor. With no end-turns, better heat transfer from coils to the motor housing. With solenoid coils, no coil insertion, high packing factor, and fabrication prior to motor assembly. This allows the motor to be more suitable for automation and mass production. The use of flux concentrators in the rotor assembly reduces the amount of permanent magnet materials, as required in traditional SPM motors. The motor has low cogging torque and a high torque constant. Long or slender motors can be built easily without coil insertion limitations, which is especially useful for aircraft hinge-line actuation motors and downhole applications for oil and gas explorations. There is no axial force among the coil/enclosure assemblies, so no special bearing is required and the friction and drag force is minimized. This compares to some axial flux motor designs that require tapered bearings to endure very high axial magnetic forces. No magnetic rotor hub is required for a flux path for rotor magnets. Use of a non-magnetic rotary shaft eliminates the rotor hub and prevents failures with a shaft positioning resolver. Elimination of magnetic rotor hubs makes it possible for a larger solid or hollow shaft for high torque applications or long and slender motors. Clocking required in the stator assembly can be designed in the housing features for easy assembly. In fault-tolerance and high-reliability applications that require physically isolation of the motor electrical windings among the motor phases, "pancake" solenoid coils can be used instead of the traditional motor windings and the phases may be separated. Traditional claw-pole motors suffer low torque density, high cogging torque, high torque ripples, and low speed range when compared to the traditional surface-mounted permanent magnet (SPM) motors because of an inefficient flux linkage between the rotor and the stator. Similar to the SPM motors, traditional claw-pole motors use large amounts of permanent magnets that can be resource and market sensitive. The non-magnetic rotary shafts have an advantage over magnetic rotary shafts in eliminating magnetic interferences with neighboring devices. In a traditional motor, such as the surface mounted magnet motor, a magnetic steel rotor hub is required to complete the magnetic flux return path. The use of magnetic steel hub reduces the remaining non-magnetic shaft diameter that is undesirable in some applications. It is often the practice to make the rotor hub and motor shaft in one piece out of magnetic steel. When a position feedback device, such as a resolver or an encoder, is mounted on the same shaft, there is magnetic interference. In addition, to concentrate and direct magnetic flux to the stator teeth, the rotor flux concentrators also enable the use of a non-magnetic shaft and eliminate the rotor hub and/or rotor hub and shaft of magnetic steels as required in the traditional SPM motors. In applications where a shaft position feedback is required, the non-magnetic shaft will not interfere with the position feedback device as in the case with magnetic shaft.

The present disclosure contemplates that many changes and modifications may be made. Therefore, while forms of the improved claw-pole motor have been shown and described, and a number of alternatives discussed, persons skilled in this art will readily appreciate that various additional changes and modifications may be made without departing from the scope of the invention, as defined and differentiated by the claims.

What is claimed is:

1. A claw-pole motor comprising:
a rotor assembly having a rotary shaft orientated about a longitudinal axis, a plurality of flux concentrators extending along the rotary shaft, and a plurality of magnetic claw poles extending along the rotary shaft;
each of the plurality of flux concentrators alternating with each of the magnetic claw poles about the rotary shaft;
each magnetic claw pole of the plurality of magnetic claw poles having a longitudinal center line and a magnetization direction perpendicular to the longitudinal center line and being directed towards or away from a corresponding flux concentrator in an alternating order;
a stator assembly having a plurality of coil assemblies, each coil assembly of the plurality of coil assemblies comprising a solenoid coil and an enclosure assembly;
the enclosure assembly having an upper portion and lower portion;

the upper portion and the lower portion of the enclosure assembly each having a plurality of stator teeth;

the stator teeth of the upper portion alternating with the stator teeth of the lower portion about the longitudinal axis;

the plurality of coil assemblies comprising a first set of coil assemblies, a second set of coil assemblies, and a third set of coil assemblies; and wherein an axial alignment degree shift between adjacent coil assemblies of the first, second, and third sets of coil assemblies is $$\frac{360°}{(\text{Total sets of coil assemblies} \times \text{Total number of magnetic claw poles})/2}.$$

2. The claw-pole motor of claim 1, wherein each flux concentrator of the plurality of flux concentrators has a rectangular cross-section and each magnetic claw pole of the plurality of magnetic claw poles has a trapezoidal cross-section, or wherein each flux concentrator of the plurality of flux concentrators has a trapezoidal cross-section and each magnetic claw pole of the plurality of magnetic claw poles has a rectangular cross-section.

3. The claw-pole motor of claim 1, wherein the number of the stator teeth of the upper portion and the lower portion of the enclosure assembly equals the number of magnetic claw poles of the plurality of magnetic claw poles.

4. The claw-pole motor of claim 1, wherein a first length between adjacent stator teeth of the upper portion and the lower portion of the enclosure assembly is more than twice a second length between the rotor assembly and the stator assembly.

5. The claw-pole motor of claim 1, wherein the rotor assembly includes a magnetic claw-pole angular pitch and the enclosure assembly of the stator assembly includes a stator teeth angular pitch, and the magnetic claw-pole angular pitch is equal to the stator teeth angular pitch.

6. The claw-pole motor of claim 1, wherein a distance between adjacent coil assemblies of the plurality of coil assemblies is greater than or equal to a distance between the rotor assembly and the stator assembly.

7. The claw-pole motor of claim 1, wherein magnetic flux flows from a first flux concentrator of the plurality of flux concentrators to a first stator tooth of a first coil assembly of the plurality of coil assemblies.

8. The claw-pole motor of claim 7, wherein the magnetic flux flows from a second stator tooth and a third stator tooth of the first coil assembly to a second flux concentrator and a third flux concentrator of the plurality of flux concentrators.

9. The claw-pole motor of claim 8, wherein the second stator tooth and the third stator tooth are adjacent to the first stator tooth about the longitudinal axis, and the second flux concentrator and the third flux concentrator are adjacent to the first flux concentrator about the rotary shaft.

10. A claw-pole motor comprising:

a rotor assembly having a rotary shaft orientated about a longitudinal axis, a plurality of flux concentrators extending along the rotary shaft, and a plurality of magnetic claw poles extending along the rotary shaft;

each of the plurality of flux concentrators alternating with each of the magnetic claw poles about the rotary shaft;

each magnetic claw pole of the plurality of magnetic claw poles having a longitudinal center line and a magnetization direction perpendicular to the longitudinal center line and being directed towards or away from a corresponding flux concentrator in an alternating order;

a stator assembly having a plurality of coil assemblies, each coil assembly of the plurality of coil assemblies comprising a solenoid coil and an enclosure assembly;

the enclosure assembly having an inner portion and an outer portion;

the inner portion and the outer portion of the enclosure assembly each having a plurality of stator teeth;

the stator teeth of the inner portion alternating with the stator teeth of the outer portion about the longitudinal axis;

the plurality of coil assemblies comprising a first set of coil assemblies, a second set of coil assemblies, and a third set of coil assemblies; and wherein an axial alignment degree shift between adjacent coil assemblies of the first, second, and third sets of coil assemblies is $$\frac{360°}{(\text{Total sets of coil assemblies} \times \text{Total number of magnetic claw poles})/2}.$$

11. The claw-pole motor of claim 10, wherein each flux concentrator of the plurality of flux concentrators has a rectangular cross-section and each magnetic claw pole of the plurality of magnetic claw poles has a trapezoidal cross-section, or wherein each flux concentrator of the plurality of flux concentrators has a trapezoidal cross-section and each magnetic claw pole of the plurality of magnetic claw poles has a rectangular cross-section.

12. The claw-pole motor of claim 10, wherein the number of the stator teeth of the inner portion and the outer portion of the enclosure assembly equals the number of magnetic claw poles of the plurality of magnetic claw poles.

13. The claw-pole motor of claim 10, wherein the plurality of stator teeth of the inner portion and the outer portion of the enclosure assembly of the stator assembly extend radially relative to the longitudinal axis and comprising an axial air gap between the plurality of stator teeth of the enclosure assembly of the stator assembly and the plurality of magnetic claw poles of the rotor assembly.

14. The claw-pole motor of claim 10, wherein the stator assembly comprises an outer coil assembly comprising an outer solenoid coil and an outer enclosure assembly, the outer enclosure assembly having a upper portion and lower portion, the upper portion and the lower portion of the outer enclosure assembly each having a plurality of outer stator teeth, and the outer stator teeth of the upper portion alternating with the outer stator teeth of the lower portion about the longitudinal axis.

15. The claw-pole motor of claim 14, wherein the plurality of stator teeth of the inner portion and the outer portion of the enclosure assembly of the stator assembly extend radially relative to the longitudinal axis, wherein the plurality of outer stator teeth of the upper portion and the lower portion of the outer enclosure assembly of the stator assembly extend axially relative to the longitudinal axis, and comprising an axial air gap between the plurality of stator teeth of the enclosure assembly of the stator assembly and the plurality of magnetic claw poles of the rotor assembly, and comprising a radial air gap between the plurality of outer stator teeth of the outer enclosure assembly of the stator assembly and the plurality of magnetic claw poles of the rotor assembly.

16. The claw-pole motor of claim 14, wherein the number of the outer stator teeth of the upper portion and the lower portion of the outer enclosure assembly equals the number of magnetic claw poles of the plurality of magnetic claw poles.

* * * * *